United States Patent
Ren et al.

(10) Patent No.: US 12,464,476 B2
(45) Date of Patent: Nov. 4, 2025

(54) POWER CONTROL BASED ON RECIPROCITY FOR CROSS LINK INTERFERENCE

(71) Applicant: QUALCOMM Incorporated, San Diego, CA (US)

(72) Inventors: Yuwei Ren, Beijing (CN); Huilin Xu, Temecula, CA (US); Qunfeng He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/997,237

(22) PCT Filed: Jul. 1, 2020

(86) PCT No.: PCT/CN2020/099671
§ 371 (c)(1),
(2) Date: Oct. 26, 2022

(87) PCT Pub. No.: WO2022/000359
PCT Pub. Date: Jan. 6, 2022

(65) Prior Publication Data
US 2023/0189163 A1    Jun. 15, 2023

(51) Int. Cl.
*H04W 52/24* (2009.01)
*H04W 52/14* (2009.01)

(52) U.S. Cl.
CPC ....... *H04W 52/243* (2013.01); *H04W 52/146* (2013.01); *H04W 52/242* (2013.01)

(58) Field of Classification Search
CPC ............. H04W 52/243; H04W 52/146; H04W 52/242; H04B 17/237
See application file for complete search history.

(56) References Cited

U.S. PATENT DOCUMENTS 10,602,453 B2   3/2020 Fakoorian et al.
2008/0316052 A1* 12/2008 Ruffini ............... H04W 28/18
340/901

(Continued)

FOREIGN PATENT DOCUMENTS

CN    110830207 A    2/2020
CN    111226469 A    6/2020

(Continued)

OTHER PUBLICATIONS

Huawei, et al., "UL Power Control for Cross-Link Interference Mitigation," 3GPP TSG RAN WG1 Meeting NR#3, R1-1715424, Sep. 18-21, 2017 (Sep. 21, 2017), 7 pages, the whole document.

(Continued)

*Primary Examiner* — Mohammad S Anwar
(74) *Attorney, Agent, or Firm* — Holland & Hart LLP

(57) ABSTRACT

Methods, systems, and devices for wireless communications are described. A first user equipment (UE) may receive, from a base station, a configuration indicating an interference reciprocity between the first UE and a second UE, where the interference reciprocity is associated with cross link interference (CLI) between the first UE and the second UE. The first UE may also receive, from the base station, an indication of a transmit power of the second UE. The first UE may measure a pathloss associated with the CLI between the first UE and the second UE based at least in part on the received transmit power of the second UE. The first UE may determine a transmit power for transmission of one or more uplink messages based at least in part on the measured pathloss and transmit the uplink messaged using the determined transmit power.

24 Claims, 18 Drawing Sheets

(56) References Cited

U.S. PATENT DOCUMENTS

2009/0286562 A1* 11/2009 Gorokhov ............. H04L 1/0026
455/501
2020/0112420 A1* 4/2020 Xu ....................... H04L 5/0073

FOREIGN PATENT DOCUMENTS

| EP | 3592024 A1 | 1/2020 |
|----|---|---|
| WO | WO-2015131357 A1 | 9/2015 |
| WO | WO-2018126792 A1 | 7/2018 |
| WO | WO-2019079395 | 4/2019 |

OTHER PUBLICATIONS

International Search Report and Written Opinion—PCT/CN2020/099671—ISA/EPO—Mar. 31, 2021.
3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3—p. 18, line 8, paragraph [0010], Section 9, clauses 6, 9.2.1, 10.2 and 12, chapter 11.1 on p. 114-116, sections 7.1, 7.2, 7.3, 7.4.
Samsung: "Cross-link interference management based on power control", 3GPP TSG RAN WG1 Meeting NR#3, R1-1716038, Nagoya, Japan, Sep. 18-21, 2017, 5 Pages, section 2.2.
Supplementary European Search Report—EP20943495—Search Authority—The Hague—Feb. 28, 2024.

* cited by examiner

POWER CONTROL BASED ON RECIPROCITY FOR CROSS LINK INTERFERENCE

CROSS REFERENCE

The present application is a 371 national stage filing of International PCT Application No. PCT/CN2020/099671 by Ren et al. entitled "POWER CONTROL BASED ON RECIPROCITY FOR CROSS LINK INTERFERENCE," filed Jul. 1, 2020, which is assigned to the assignee hereof, and which is expressly incorporated by reference in its entirety herein.

FIELD OF TECHNOLOGY

The following relates generally to wireless communications and more specifically to power control based on reciprocity for cross link interference (CLI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, two or more UEs may have different timing or resource configurations, such that one UE may be configured to receive a signal in a symbol or slot, while another UE is configured to transmit a signal in the same symbol or slot. When the UEs are in close proximity, the UEs may be able to detect signals transmitted by each other, and one UE may experience cross link interference (CLI) caused by another UE due to conflicting slot configurations. In some cases, there may be a reciprocal effect (e.g., CLI reciprocity) when the victim UE (i.e., the UE experiencing CLI) becomes the aggressor UE (i.e., the UE causing the CLI) in a different symbol or slot. For example, two or more UEs may interfere with each other by CLI when each of the UEs are configured with one or more downlink symbols that overlap with one or more uplink symbols of another UE, which may result in increased interference experienced by the UEs, lost communications, or other issues.

SUMMARY

The described techniques relate to improved methods, systems, devices, and apparatuses that support power control based on reciprocity for cross link interference (CLI). Generally, the described techniques provide for a method for interference management by a first user equipment (UE) by adjusting the transmission power for an uplink transmission based at least in part on a measurement of CLI from a second UE. The first UE may receive, from a base station, a configuration indicating a CLI reciprocity (e.g., including CLI resources associated with CLI reciprocity) between the first UE and a second UE, where the interference reciprocity is associated with CLI between the first UE and the second UE. The first UE may also receive, from the base station, an indication of a transmit power of the second UE. The first UE may measure a pathloss associated with the CLI between the first UE and the second UE based at least in part on the received transmit power of the second UE. The first UE may determine a transmit power for transmission of one or more uplink messages based at least in part on the measured pathloss and transmit the uplink messaged using the determined transmit power.

A method of wireless communications at a first UE is described. The method may include receiving, from a base station, a configuration indicating an interference reciprocity between the first UE and a second UE, the interference reciprocity associated with CLI between the first UE and the second UE, receiving, from the base station, an indication of a configured transmit power of the second UE based on the CLI between the first UE and the second UE, measuring a pathloss associated with the CLI between the first UE and the second UE based on the configured transmit power, determining a transmit power for transmission of one or more uplink messages by the first UE based on the measured pathloss, and transmitting the one or more uplink messages in accordance with the determined transmit power.

An apparatus for wireless communications at a first UE is described. The apparatus may include a processor, memory coupled with the processor, and instructions stored in the memory. The instructions may be executable by the processor to cause the apparatus to receive, from a base station, a configuration indicating an interference reciprocity between the first UE and a second UE, the interference reciprocity associated with CLI between the first UE and the second UE, receive, from the base station, an indication of a configured transmit power of the second UE based on the CLI between the first UE and the second UE, measure a pathloss associated with the CLI between the first UE and the second UE based on the configured transmit power, determine a transmit power for transmission of one or more uplink messages by the first UE based on the measured pathloss, and transmit the one or more uplink messages in accordance with the determined transmit power.

Another apparatus for wireless communications at a first UE is described. The apparatus may include means for receiving, from a base station, a configuration indicating an interference reciprocity between the first UE and a second UE, the interference reciprocity associated with CLI between the first UE and the second UE, receiving, from the base station, an indication of a configured transmit power of the second UE based on the CLI between the first UE and the second UE, measuring a pathloss associated with the CLI between the first UE and the second UE based on the configured transmit power, determining a transmit power for transmission of one or more uplink messages by the first UE based on the measured pathloss, and transmitting the one or more uplink messages in accordance with the determined transmit power.

A non-transitory computer-readable medium storing code for wireless communications at a first UE is described. The code may include instructions executable by a processor to receive, from a base station, a configuration indicating an interference reciprocity between the first UE and a second UE, the interference reciprocity associated with CLI between the first UE and the second UE, receive, from the base station, an indication of a configured transmit power of the second UE based on the CLI between the first UE and the second UE, measure a pathloss associated with the CLI between the first UE and the second UE based on the configured transmit power, determine a transmit power for transmission of one or more uplink messages by the first UE based on the measured pathloss, and transmit the one or more uplink messages in accordance with the determined transmit power.

Some examples of the method, apparatuses, and non-transitory computer-readable medium described herein may further include operations, features, means, or instructions for determining a resource associated with the CLI between the first UE and the second UE based on the configuration, performing an interference measurement on the resource, and determining the pathloss between the first UE and the second UE based on the interference measurement on the resource.

In some examples of the method, apparatuses, and non-transitory computer-readable medium described herein, determining the pathloss may include operations, features, means, or instructions for determining a difference between the configured transmit power of the UE and the interference measurement performed on the resource.

In some examples of the method, apparatuses, and non-transitory computer-readable medium described herein, performing the interference measurement may include operations, features, means, or instructions for measuring a reference signal received power (RSRP) associated with the second UE on the resource.

In some examples of the method, apparatuses, and non-transitory computer-readable medium described herein, the interference measurement may be performed using a same spatial filter used for transmission of the one or more uplink messages.

Some examples of the method, apparatuses, and non-transitory computer-readable medium described herein may further include operations, features, means, or instructions for determining resources associated with CLI between the UE and multiple UEs, determining multiple pathloss values associated with CLI between the UE and the multiple UEs based on the resources, where each of the multiple pathloss values corresponds to a respective one of the multiple UEs, and determining the pathloss based on the multiple pathloss values.

In some examples of the method, apparatuses, and non-transitory computer-readable medium described herein, determining the pathloss may include operations, features, means, or instructions for determining the pathloss to be a minimum pathloss value of the multiple pathloss values.

In some examples of the method, apparatuses, and non-transitory computer-readable medium described herein, determining the pathloss may include operations, features, means, or instructions for determining the pathloss to be an average pathloss value of the multiple pathloss values in a decibel meter (dB) domain.

In some examples of the method, apparatuses, and non-transitory computer-readable medium described herein, determining the pathloss may include operations, features, means, or instructions for determining the pathloss to be an average pathloss value of the multiple pathloss values in a linear domain, and converting the average pathloss value of the multiple pathloss values in the linear domain to the dB meter domain.

Some examples of the method, apparatuses, and non-transitory computer-readable medium described herein may further include operations, features, means, or instructions for identifying a pathloss coefficient based on the cross link interference, and determining the transmit power based on the measure pathloss and the pathloss coefficient.

In some examples of the method, apparatuses, and non-transitory computer-readable medium described herein, determining the transmit power may include operations, features, means, or instructions for determining the transmit power based on the signal type associated with the one or more uplink messages, where the signal type includes one of an uplink data channel, an uplink control channel, a reference signal, or a random access channel.

In some examples of the method, apparatuses, and non-transitory computer-readable medium described herein, determining the transmit power may include operations, features, means, or instructions for adjusting the transmit power from a first value to a second value greater than the first value based on the measured pathloss exceeding a pathloss threshold.

In some examples of the method, apparatuses, and non-transitory computer-readable medium described herein, determining the transmit power may include operations, features, means, or instructions for adjusting the transmit power from a first value to a second value less than the first value based on the measured pathloss being below a pathloss threshold.

In some examples of the method, apparatuses, and non-transitory computer-readable medium described herein, the configuration indicating an interference reciprocity between the first UE and the second UE may include operations, features, means, or instructions for measuring the pathloss associated with the CLI between the first UE and the second UE in the first symbol, and transmitting at least one of the one or more uplink messages in the second symbol.

A method of wireless communications at a base station is described. The method may include determining an interference reciprocity between a first UE and a second UE, the interference reciprocity associated with CLI between the first UE and the second UE, transmitting, to the first UE, a configuration indicating the interference reciprocity between the first UE and a second UE, configuring a transmit power for the second UE based on the cross link interference, and transmitting, to the first UE, an indication of the configured transmit power for the second UE.

An apparatus for wireless communications at a base station is described. The apparatus may include a processor, memory coupled with the processor, and instructions stored in the memory. The instructions may be executable by the processor to cause the apparatus to determine an interference reciprocity between a first UE and a second UE, the interference reciprocity associated with CLI between the first UE and the second UE, transmit, to the first UE, a configuration indicating the interference reciprocity between the first UE and a second UE, configure a transmit power for the second UE based on the cross link interference, and transmit, to the first UE, an indication of the configured transmit power for the second UE.

Another apparatus for wireless communications at a base station is described. The apparatus may include means for determining an interference reciprocity between a first UE and a second UE, the interference reciprocity associated with CLI between the first UE and the second UE, transmitting, to the first UE, a configuration indicating the interference reciprocity between the first UE and a second UE, configuring a transmit power for the second UE based on the cross link interference, and transmitting, to the first UE, an indication of the configured transmit power for the second UE.

A non-transitory computer-readable medium storing code for wireless communications at a base station is described. The code may include instructions executable by a processor to determine an interference reciprocity between a first UE and a second UE, the interference reciprocity associated with CLI between the first UE and the second UE, transmit, to the first UE, a configuration indicating the interference reciprocity between the first UE and a second UE, configure a transmit power for the second UE based on the cross link interference, and transmit, to the first UE, an indication of the configured transmit power for the second UE.

Some examples of the method, apparatuses, and non-transitory computer-readable medium described herein may further include operations, features, means, or instructions for transmitting, in the configuration, a set of resources associated with the CLI between the first UE and the second UE.

Some examples of the method, apparatuses, and non-transitory computer-readable medium described herein may further include operations, features, means, or instructions for transmitting the configuration via radio resource control (RRC) signaling, medium access control (MAC) control element (MAC-CE), or downlink control information (DCI).

Some examples of the method, apparatuses, and non-transitory computer-readable medium described herein may further include operations, features, means, or instructions for transmitting the indication of the configured transmit power for the second UE via RRC signaling, MAC-CE, or DCI.

DETAILED DESCRIPTION

Figure 1:
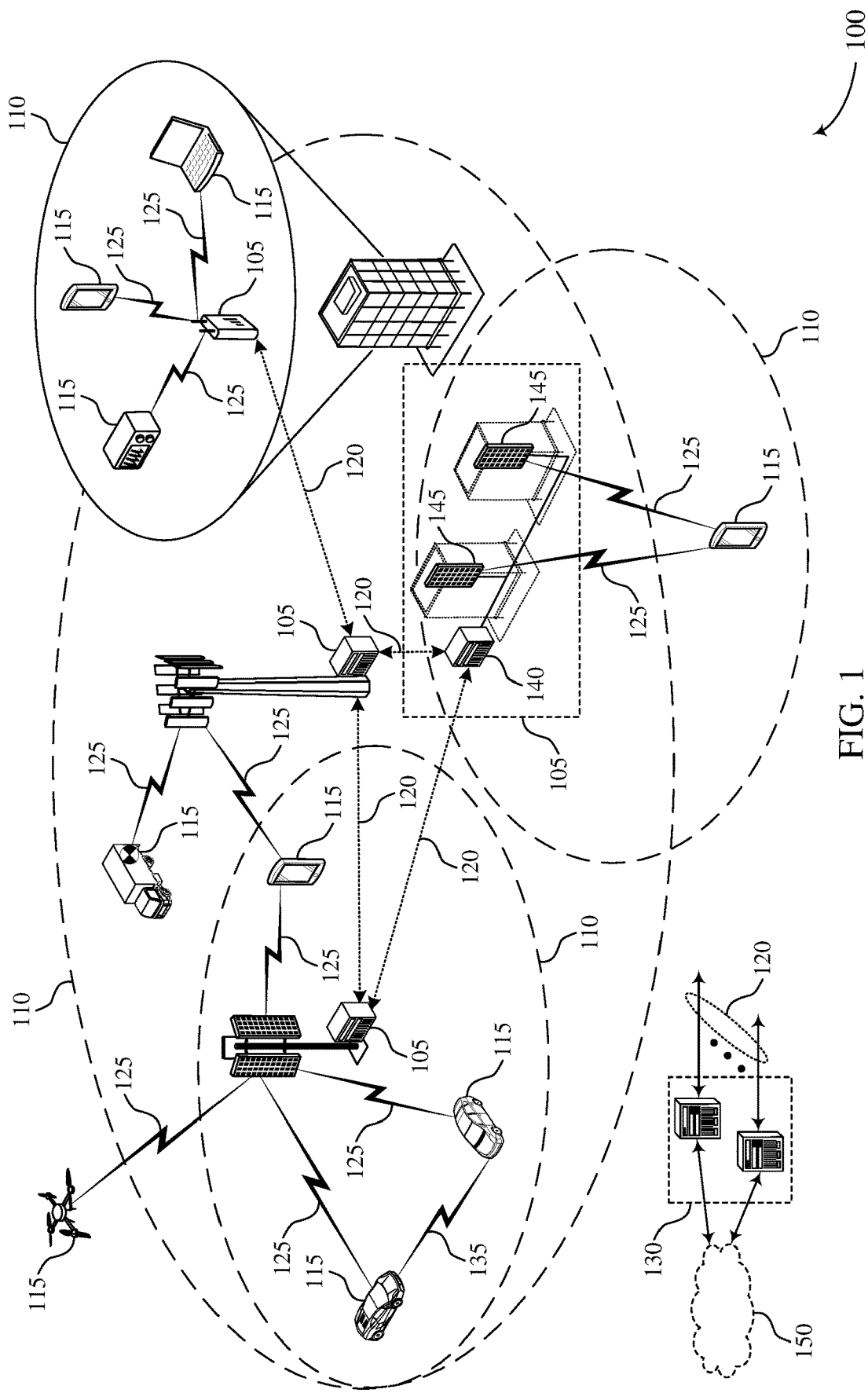
FIG. 1 illustrates an example of a wireless communications system that supports power control based on reciprocity for cross link interference (CLI) in accordance with aspects of the present disclosure.

Wireless communications systems may support communications for multiple wireless devices, referred to as user equipment (UE). For example, a first UE and the one or more second UEs may be served by the same base station and by the same serving cell, but in other cases, the first and second UEs may be served by different cells or base stations, where the different serving cells may at least partially overlap in coverage. In such cases, the UEs may be able to detect transmissions from other UEs, which may result in interference.

The first UE may have a first slot format, while the second UE may have a second slot format. If the slot formats are different for a given slot, the slot format for the first UE may conflict with the slot format for the second UE, which may result in interference. For example, the second UE may be configured to transmit uplink transmissions in the same time resources (e.g., slot or slots) in which the first UE is configured to receive downlink transmissions. In such cases, the uplink transmission by the second UE may interfere with downlink receptions at the first UE. This may be an example of cross link interference (CLI), where the second UE is an aggressor UE and the first UE is a victim UE. CLI may occur in systems configured to support and utilize time division duplexing (TDD) communications for wireless devices. CLI may arise between UEs served by different cells, though CLI may also arise between UEs of a same cell when one UE is configured for a downlink transmission when another UE is configured for an uplink transmission. CLI may be caused by any uplink transmission from the aggressor UE including but not limited to Physical Uplink Control Channel (PUCCH), Physical Uplink Shared Channel (PUSCH), Physical Random Access Channel (PRACH), PRACH preamble, and Sounding Reference Signal (SRS) transmissions.

In some examples, two UEs may interfere with each other by CLI when each of the UEs has one or multiple downlink time resources (e.g., slots or symbols) that overlap in time with the uplink time resources (e.g., slots or symbols) of the other UE. This mutual CLI between two or more UEs may be referred to as CLI reciprocity. For example, in a slot, a first UE may be configured for an uplink transmission and a second UE may be configured for a downlink transmission. At the this time, the second UE may experience CLI from the first UE transmitting uplink, and the first UE may be the aggressor UE and the second UE may be the victim UE for CLI. At a second slot, the first UE may be configured for an uplink transmission and the second UE may be configured for an uplink transmission. At this time, the first UE may experience CLI from the second UE, and the first UE may be the victim UE and the second UE may be the aggressor UE for CLI. Whether a detectable CLI occurs may also depend on the transmission and reception beams of the first UE and the second UE as well as the transmission power of each first UE and the second UE.

The network such as a base station may configure the first UE with a CLI measurement configuration, so that the victim UE may perform interference management. The victim UE may measure the CLI and report the measurement to the network. The victim UE may receive third layer measurement and reporting mechanisms for the CLI measurement. The CLI measurement may include measurements of one or more of SRSs, reference signal received power (RSRP), or received signal strength indicator (RSSI) as the measurement metric. The measurement resource configuration may also include periodicity, frequency, and resource blocks or orthogonal frequency division multiplexing (OFDM) symbols on which the victim UE is to measure the CLI. If RSRP is configured, the resource configuration also includes information about the SRS sequence to be measured. The CLI may correspond to a transmission of an uplink reference signal, such as the SRS or an uplink channel by the aggressor UE. The aggressor UE may use a transmit beam (e.g., a spatial filter for transmission) to transmit the uplink signal, where the transmit beam is the same as the receive beam that the aggressor UE uses to receive downlink signals from the base station, which may result in interference.

There may be timing differences between the slot configuration of the victim UE and the slot configuration of the aggressor UE. The victim UE may not be aware of the slot configuration of the aggressor UE, where the slot configuration may include TDD uplink or downlink configuration or SRS transmission configuration. In order to measure the CLI, the victim UE may follow the measurement resource configuration received from the network.

In some examples, when CLI reciprocity exists between two UEs, a first UE may perform power control to reduce the CLI to other UEs. The first UE may determine to adjust the transmit power for an uplink transmission to reduce the CLI to other UEs. In some cases, the determination of the transmit power for the uplink transmission may be based on a CLI measurement at the first UE.

In some examples, a first UE may perform power control for CLI based on a CLI measurement and a configured transmission power of a second UE. A network may configure the first UE with a CLI measurement resource, the network may also configure the first UE with the transmission power level of a second UE, where the second UE is generating the CLI observed by the first UE. The first UE may measure the CLI from the second UE and use the measured CLI and the configured transmission power level of the second UE to estimate the pathloss between the first UE and the second UE. The first UE may use the estimated pathloss between the first UE and the second UE to adjust the transmission power level of an uplink transmission by the first UE to reduce the CLI experienced at the second UE. Similarly, the second UE may also perform power control for CLI based on a CLI measurement and a configured transmission power of the first UE. A network may configure the second UE with a CLI measurement resource and the transmission power level of the first UE. The second UE may measure the CLI from the first UE and use the measured CLI and the configured transmission power level of the first UE to estimate the pathloss between the first UE and the second UE. The second UE may use the estimated pathloss between the first UE and the second UE to adjust the transmission power level of an uplink transmission by the second UE to reduce the CLI experienced at the first UE.

In some examples, a first UE may perform power control for CLI based on a CLI measurement and an estimation of pathloss between a first UE and a second UE. In some cases, the estimation of pathloss between the first UE and the second UE may be based on the transmit power of the CLI measurement resource and the CLI measurement. In some cases, the estimation of pathloss between the first UE and the second UE may equal the transmit power of the CLI measurement resource minus the CLI measurement. In some examples, the estimation of pathloss between the first UE and the second UE may be based on the transmit power of the CLI measurement resource and the CLI measurement, where the CLI measurement may be a RSRP measurement. In some cases, when performing power control for CLI, the first UE may use the same spatial filtering for the CLI measurement and the uplink transmission. Using the same spatial filtering for the CLI measurement and for the uplink transmission, the pathloss estimate estimated from the CLI measurement by the first UE may reflect the pathloss for CLI from the first UE to the second UE.

In some examples, a first UE may experience CLI reciprocity with multiple second UEs. In some cases, the first UE may be configured with a transmission power level for each of the multiple second UEs. In this case, the first UE may determine the pathloss between the first UE and each of the multiple second UEs based on the configured transmission power levels. In other cases, the first UE may estimate multiple pathloss values based on CLI measurement resources from each of the multiple second UE. In some examples, the first UE may use the minimum of the pathloss values between the first UE and the multiple second UEs to perform power control for CLI. In some examples, the first UE may use the average of all of the pathloss values between the first UE and the multiple second UEs to perform power control for CLI. In some cases, the first UE may average the pathloss values in the decibels milliwatts (dBm) domain. In other cases, the first UE may average the pathloss values in the linear domain then convert the average from the linear domain to the dBm domain.

In some cases, power control is separately applied to uplink transmissions, including PUSCH, PUCCH, SRS, and PRACH. Power control for uplink transmission may be applied according to specified power control formulas. For example, power control for a PUSCH transmission may be applied according to the following equation: $P_{PUSCH}(j, q, l) = \min\{P_{CMAX}, P_{O\_PUSCH}(j) + 10 \cdot \log_{10}(2^{\mu} \cdot M_{RB}^{PUSCH}) + \alpha(j) \cdot PL(q) + \Delta_{TF} f(l)\}$, where $P_{CMAX}$ is the maximum transmit power, $P_{O\_PUSCH}(j)$ is the target power, $\alpha(j)$ is the pathloss scaling factor, $PL(q)$ is the pathloss between UE and the serving base station, $\Delta_{TF}$ accounts for modulation and coding schemes (MCS) and code rate for uplink transmission, $2^{\mu} \cdot M_{RB}^{PUSCH}$ is the bandwidth of the uplink transmission, and $f(l)$ is the closed loop power control value. In some examples, in order to perform power control for CLI, the specified power control formulas for uplink transmissions may be modified to include additional terms. In some cases, the specified power control formulas may be modified to include a term, $PL_{CLI}$, that represents the pathloss between the first UE and the second UE and a term, $\beta$, that represents a pathloss coefficient according to the following equation: $P_{PUSCH}(j,q,l) = \min\{P_{CMAX}, P_{O\_PUSCH}(j) + 10 \cdot \log_{10}(2^{\mu} \cdot M_{RB}^{PUSCH}) + \alpha(j) \cdot PL(q) - \beta \cdot PL_{CLI} + \Delta_{TF} + f(l)\}$, where q determines the downlink reference signal including channel state information reference signals (CSI-RS) and synchronization signal blocks (SSB) that is used to estimate the downlink path loss for the PUSCH transmission, j determines one of the multiple sets of open loop power control parameters to be used for open loop power control, and l, determines one of the two sets of closed-loop power control parameters to be used for closed-loop power control.

Aspects of the disclosure are initially described in the context of wireless communications systems. Aspects of the disclosure are further illustrated by and described with reference to a time-frequency resource configuration and process flow diagrams. Aspects of the disclosure are further illustrated by and described with reference to apparatus diagrams, system diagrams, and flowcharts that relate to power control based on reciprocity for CLI.

FIG. 1 illustrates an example of a wireless communications system 100 that supports power control based on reciprocity for CLI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may support techniques for power control based on reciprocity for CLI for between two or more UEs 115. In some examples, a first UE 115 may be an aggressor UE, and may perform power control (e.g., reduce or adjust uplink transmit power) in a given symbol or slot to reduce the CLI experienced by other UEs 115 in wireless communications system 100. For instance, the first UE 115 may determine to reduce the transmit power for an uplink transmission over time resources that are identified as CLI resources (i.e., resourced in which the first UE 115 causes CLI interference at one or more other UEs 115) to reduce the CLI experienced by other UEs 115. In some cases, the determination of the transmit power for the uplink transmission may be based on a CLI measurement at the first UE 115, an estimated pathloss between the first UE 115 and the one or more other UEs 115, or any combination thereof.

Figure 2A:
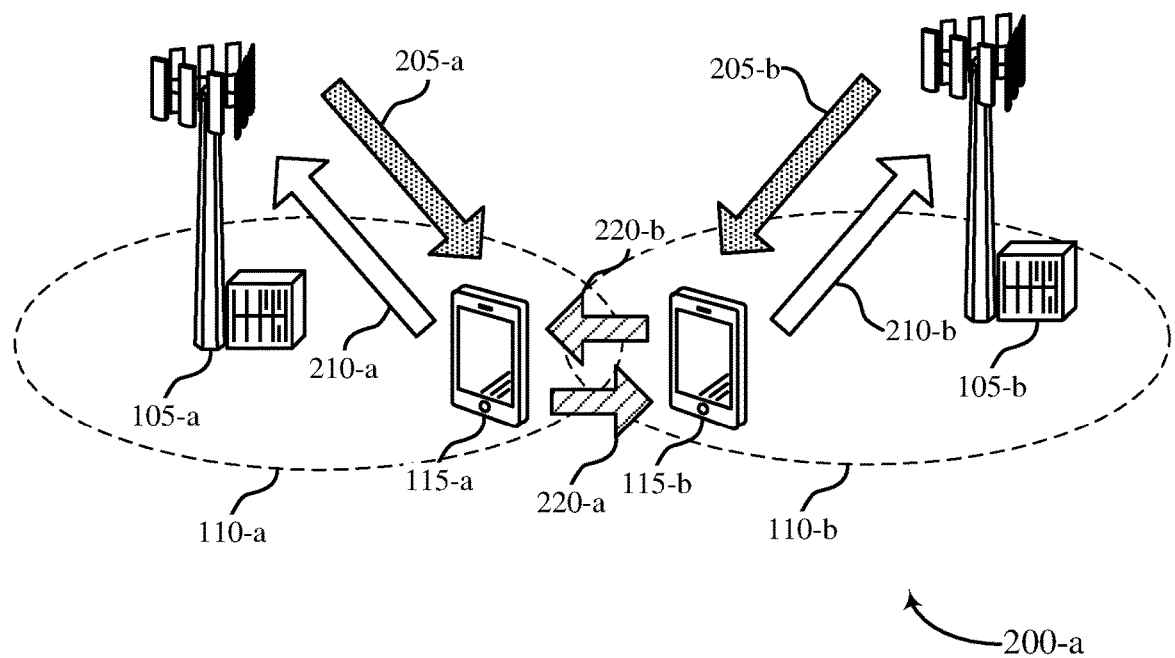
FIGS. 2A and 2B illustrate examples of wireless communications systems that supports power control based on reciprocity for CLI in accordance with aspects of the present disclosure.
Figure 2B:
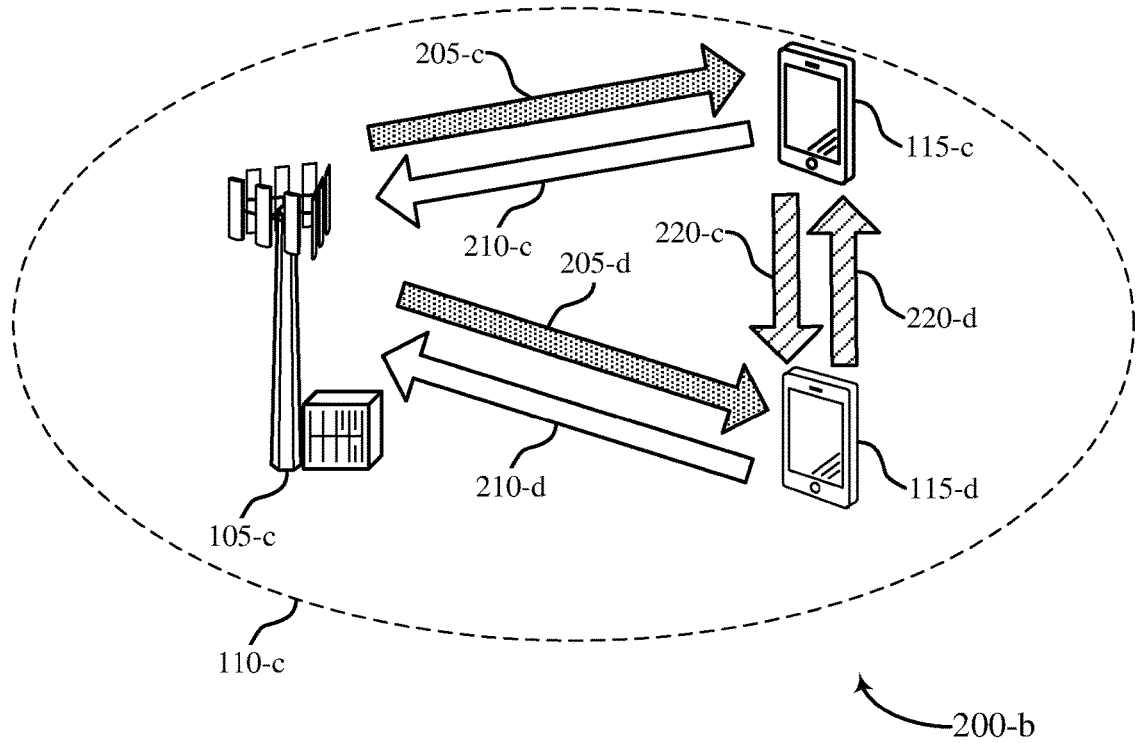

FIGS. 2A and 2B illustrate an example of wireless communications system **200-*a* and wireless communications system 200-*b* that support power control based on reciprocity for CLI in accordance with aspects of the present disclosure. In some examples, wireless communications system 200-*a* and wireless communications system 200-*b* may implement aspects of wireless communications system 100. For examples, wireless communications system 200-*a* and wireless communications system 200-*b* may include one or more base stations 105 and one or more UEs 115, which may represent examples of a base station 105 and UE 115 described with reference to FIG. 1. A wireless communications system 200 may for example, include two or more UEs 115 such as UEs 115-*a* and 115-*b* in wireless communications system 200-*a* and UEs 115-*c* and 115-*d* in wireless communications system 200-*b*. In some cases, one or more uplink transmissions 210 from a first UE 115 may cause interference, such as CLI 220, at a second victim UE 115**.

FIG. 2A illustrates an example wireless communications system **200-*a* that supports power control based on reciprocity for CLI. In wireless communications system 200-*a*, a UE 115-*a* may be served by a base station 105-*a* in a coverage area 110-*a* and a UE 115-*b* may be served by a base station 105-*b* in a coverage area 110-*b*. In some examples, coverage area 110-*a* and coverage area 110-*b* may be in close physical proximity or physically overlapping. UE 115-*a* and UE 115-*b*** may be close in proximity and may have conflicting slot configurations.

In some examples, UE **115-*a* and UE 115-*b* may experience CLI reciprocity. An uplink transmission 210-*a* from UE 115-*a* may cause CLI 220-*a* at UE 115-*b* and an uplink transmission 210-*b* from UE 115-*b* may cause CLI 220-*b* at UE 115-*a*. UE 115-*a* may be configured with a first slot format, while UE 115-*b* may be configured with a second slot format. If the first slot format is different from the second format for a given set of slots, then UE 115-*a* may be configured for an uplink transmission while UE 115-*b* is configured for a downlink transmission or, alternatively, UE 115-*b* may be configured for an uplink transmission while UE 115-*a*** is configured for a downlink transmission.

In some examples, UE **115-*a* may perform interference management to reduce the CLI 220-*a* experienced by UE 115-*b*. UE 115-*a* may perform interference management by adjusting the transmission power for uplink transmission 210-*a* in order to reduce the CLI experienced by UE 115-*b*. UE 115-*a* may adjust the transmission power for uplink transmission 210-*a* based at least in part on an estimation of pathloss between UE 115-*a* and UE 115-*b*. UE 115-*a* may determine an estimation of pathloss between UE 115-*a* and UE 115-*b* based at least in part on a CLI measurement of CLI 220-*b*, transmitted by UE 115-*b***.

In some examples, UE **115-*a* may communicate with base station 105-*a* to perform interference management. UE 115-*a* may receive, from base station 105-*a*, a CLI measurement configuration in a downlink transmission 205-*a*. The CLI measurement configuration may include an indication of a CLI measurement resources for UE 115-*a*** to use for measurement of CLI 220-*b* from UE 115-*b*. UE 115-*a* may receive third layer measurement and reporting mechanisms for the CLI measurement. The CLI measurement may include measurements of SRSs, or RSRP measurement. The measurement resource configuration may also include periodicity, frequency, and resource blocks or OFDM symbols on which UE 115-*a* is to measure the CLI 220-*b*. The CLI 220-*b* may correspond to a transmission of an uplink reference signal, such as the SRS, or an uplink channel by the UE 115-*b*.

In some examples, UE 115-*a* may determine an estimation of a pathloss between UE 115-*a* and UE 115-*b* based at least in part on a CLI measurement of CLI 220-*b* from UE 115-*b* and an indication of the transmission power used by UE 115-*b* to transmit the uplink transmission 210-*b* that generates CLI 220-*b*. UE 115-*a* may receive, from base station 105-*a*, an indication of the transmission power used by UE 115-*b* to transmit the uplink transmission 210-*b* that generates CLI 220-*b*.

In some examples, UE 115-*a* may measure or estimate a pathloss between UE 115-*a* and UE 115-*b* based at least in part on a CLI measurement of CLI 220-*b* from UE 115-*b* and the transmission power used during the CLI measurement resource. In some examples, the pathloss may be estimated as the difference between the transmit power used during the CLI measurement resource and the CLI measurement. In some examples, UE 115-*a* may perform the CLI measurement by performing a RSRP measurement. In some examples, UE 115-*a* may perform the CLI measurement using the same spatial filter that UE 115-*a* will use for uplink transmission.

In some examples, UE 115-*a* may adjust the transmission power for uplink transmissions 210-*a* based on the pathloss value determined from the CLI measurement. In some cases, when a higher pathloss is determined, the transmission power for uplink transmissions 210-*a* may be set higher. In other cases, when a lower pathloss is determined, the transmission power for uplink transmission 210-*a* may be set lower.

In some examples, UE 115-*a* may use a set of uplink power control formulas that support power control based on reciprocity for CLI. The set of uplink power control formulas may include the power control formulas specific for each type of uplink transmission, such as but not limited to PUSCH, PUCCH, SRS, and PRACH. The power control formulas that support power control based on reciprocity for CLI may include terms to adjust for the determined pathloss. The power control formulas that support power control based on reciprocity for CLI may adjust the power level such that the CLI 220 experienced at UE 115-*b* is below a threshold.

In some examples, UE 115-*a* may transmit uplink transmission 210-*a* with a transmission power determined based on at least the CLI measurement of CLI 220-*b*. In some example, the CLI 220-*a* experienced at UE 115-*b* from uplink transmission 210-*a* may be reduced below a threshold or eliminated.

In some examples, UE 115-*b* may perform power control based on reciprocity for CLI similar to the method discussed herein for UE 115-*a*. UE 115-*b* may adjust the transmission power for uplink transmission 210-*b* based on a CLI measurement of CLI 220-*a* such that the CLI 220-*b* experienced at UE 115-*a* is less than a threshold.

FIG. 2B illustrates an example wireless communications system 200-*b* that supports power control based on reciprocity for CLI. In wireless communications system 200-*b*, a UE 115-*c* and a UE 115-*d* may be served by a base station 105-*c* in a coverage area 110-*c*. In some examples, UE 115-*c* and UE 115-*d* may be close in proximity and may have conflicting slot configurations.

In some examples, UE 115-*c* and UE 115-*d* may experience CLI reciprocity. An uplink transmission 210-*c* from UE 115-*c* may cause CLI 220-*c* at UE 115-*d* and an uplink transmission 210-*d* from UE 115-*d* may cause CLI 220-*d* at UE 115-*c*. UE 115-*c* may be configured with a first slot format, while UE 115-*d* may be configured with a second slot format. If the first slot format is different from the second format for a given set of slots, then UE 115-*c* may be configured for an uplink transmission while UE 115-*d* is configured for a downlink transmission or, alternatively, UE 115-*d* may be configured for an uplink transmission while UE 115-*c* is configured for a downlink transmission.

In some examples, UE 115-*c* may perform interference management to reduce the CLI 220-*c* experienced by UE 115-*d*. UE 115-*c* may perform interference management by adjusting the transmission power for uplink transmission 210-*c* in order to reduce the CLI experienced by UE 115-*d*. UE 115-*c* may adjust the transmission power for uplink transmission 210-*c* based at least in part on an estimation of pathloss between UE 115-*c* and UE 115-*d*. UE 115-*c* may determine an estimation of pathloss between UE 115-*c* and UE 115-*d* based at least in part on a CLI measurement of CLI 220-*d*, transmitted by UE 115-*d*.

In some examples, UE 115-*c* may communicate with base station 105-*c* to perform interference management. UE 115-*c* may receive, from base station 105-*c*, a CLI measurement configuration in a downlink transmission 205-*c*. The CLI measurement configuration may include an indication of a CLI measurement resources for UE 115-*c* to use for measurement of CLI 220-*d* from UE 115-*d*. UE 115-*c* may receive third layer measurement and reporting mechanisms for the CLI measurement. The CLI measurement may include measurements of SRSs, or RSRP measurement. The measurement resource configuration may also include periodicity, frequency, and resource blocks or OFDM symbols on which UE 115-*c* is to measure the CLI 220-*d*. The CLI 220-*d* may correspond to a transmission of an uplink reference signal, such as the SRS, or an uplink channel by the UE 115-*d*.

In some examples, UE 115-*a* may determine an estimation of a pathloss between UE 115-*c* and UE 115-*d* based at least in part on a CLI measurement of CLI 220-*d* from UE 115-*d* and an indication of the transmission power used by UE 115-*d* to transmit the uplink transmission 210-*d* that generates CLI 220-*d*. UE 115-*c* may receive, from base station 105-*c*, an indication of the transmission power used by UE 115-*d* to transmit the uplink transmission 210-*d* that generates CLI 220-*d*.

In some examples, UE 115-*c* may estimate or measure a pathloss between UE 115-*c* and UE 115-*d* based at least in part on a CLI measurement of CLI 220-*d* from UE 115-*d* and the transmission power of the CLI measurement resource. In some examples, the pathloss may be estimated as the difference between the transmit power of the CLI measurement resource and the CLI measurement. In some examples, UE 115-*c* may perform the CLI measurement by performing a RSRP measurement. In some examples, UE 115-*c* may perform the CLI measurement using the same spatial filter that UE 115-*c* will use for uplink transmission.

In some examples, UE 115-*c* may adjust the transmission power for uplink transmissions 210-*c* based on the pathloss value determined from the CLI measurement. In some cases, when a higher pathloss is determined, the transmission power for uplink transmissions 210-*c* may be set higher. In other cases, when a lower pathloss is determined, the transmission power for uplink transmission 210-c may be set lower.

In some examples, UE 115-c may use a set of uplink power control formulas that support power control based on reciprocity for CLI. The set of uplink power control formulas may include the power control formulas specific for each type of uplink transmission, such as but not limited to PUSCH, PUCCH, SRS, and PRACH. The power control formulas that support power control based on reciprocity for CLI may include terms to adjust for the determined pathloss. The power control formulas that support power based on reciprocity control for CLI may adjust the power level such that the CLI 220-c experienced at UE 115-d is below a threshold.

In some examples, UE 115-c may transmit uplink transmission 210-c with a transmission power determined based on at least the CLI measurement of CLI 220-d. In some example, the CLI 220-c experienced at UE 115-d from uplink transmission 210-c may be reduced below a threshold or eliminated.

In some examples, UE 115-d may perform power control based on reciprocity for CLI similar to the method discussed herein for UE 115-c. UE 115-d may adjust the transmission power for uplink transmission 210-d to base station 105-c based on a CLI measurement of CLI 220-c such that the CLI 220-d experienced at UE 115-c is less than a threshold.

Figure 3:
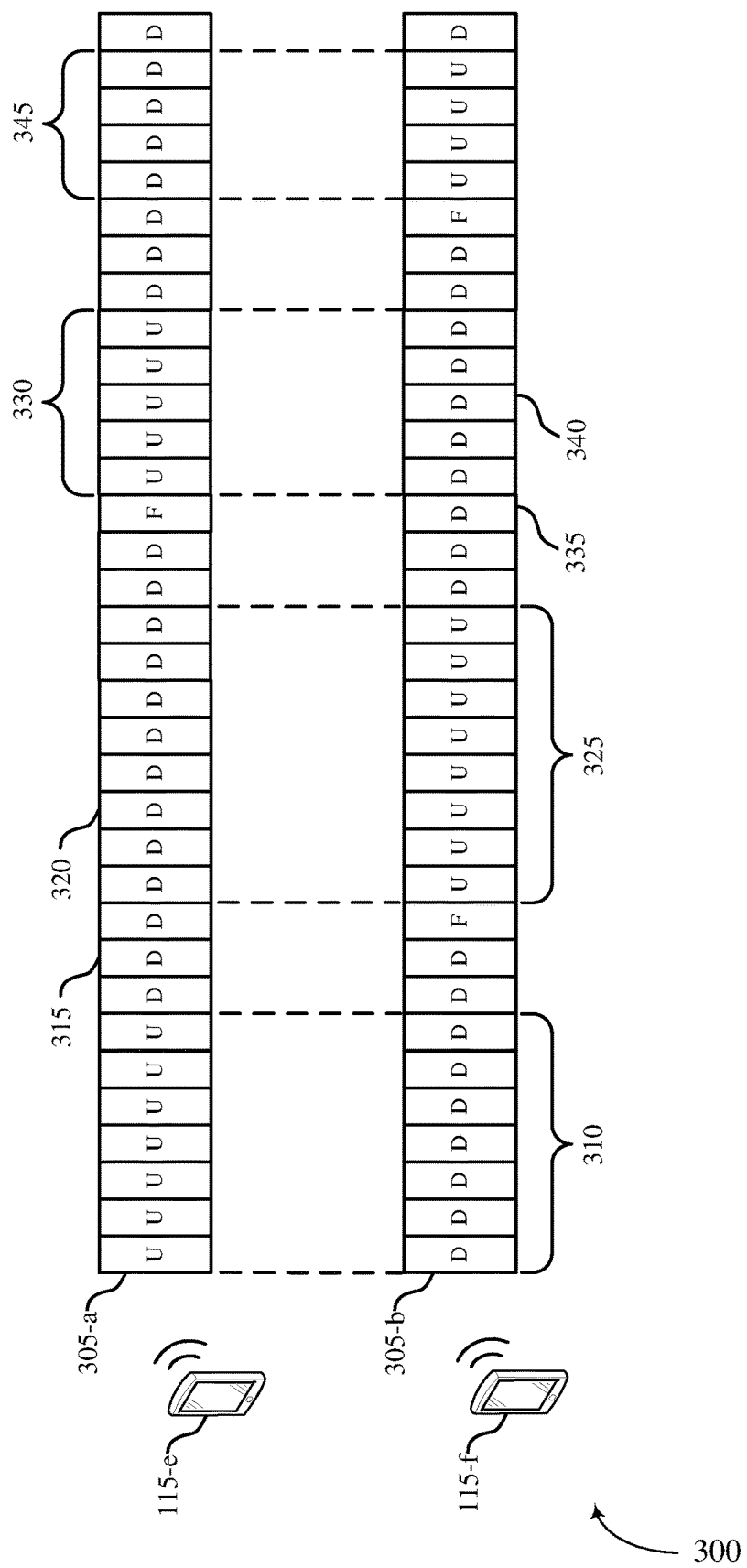
FIG. 3 illustrates an example of a time-frequency resource configuration that supports power control based on reciprocity for CLI in accordance with aspects of the present disclosure.

FIG. 3 illustrates an example of a time-frequency resource configuration 300 that supports power control based on reciprocity for CLI in accordance with aspects of the present disclosure. In some examples, time-frequency resource configuration 300 may implement aspects of wireless communications system 100, wireless communications system 200-a and wireless communications system 200-b. In some examples, time-frequency resource configuration 305-a and time-frequency resource configuration 305-b may be examples of time-frequency resource configurations used for transmissions in wireless communications system 100, wireless communications system 200-a and wireless communications system 200-b. Time-frequency resource configuration 305-a may configure resources for UE 115-e. Time-frequency resource configuration 305-b may configure resources for UE 115-f. In some examples, the time-frequency resources configured by time-frequency resource configuration 305-a may have a frequency that is sufficiently close to the frequency configured by time-frequency resource configuration 305-b, such that interference may occur between UE 115-e and UE 115-f.

In FIG. 3, resources label with a "U" may be configured for uplink transmission, resources labeled with a "D" may be configured for downlink transmission, and resources labeled with an "F" may be configured as a flexible resource, which may be an uplink transmission, a downlink transmission, guard band, etc.

At a time period 310, UE 115-e may be configured with resources for an uplink transmission and UE 115-f may be configured with resources for a downlink transmission. UE 115-e may use a first transmission power for the uplink transmission during time period 310. The first transmission power may be sufficiently high to induce CLI at UE 115-f. UE 115-f may experience CLI from UE 115-e during time period 310.

In some examples, after time period 310, UE 115-e may be configured with resources for downlink transmissions. In some examples, at slot 315, UE 115-e may receive a downlink transmission that contains an indication of CLI reciprocity and configures resources for a CLI measurement at slot 320.

At a second time period 325, UE 115-f may be configured with resources for an uplink transmission and UE 115-e may be configured with resources for a downlink transmission. At slot 320, UE 115-e may measure the CLI from UE 115-f. UE 115-e may determine a pathloss value for the pathloss between UE 115-e and UE 115-f based on the CLI measurement measured at slot 320. UE 115-e may determine a transmission power level based on the determined pathloss value for a future uplink transmission.

At a third time period 330, UE 115-e may be configured with resources for an uplink transmission. UE 115-e may transmit an uplink transmission during third time period 330 using the transmission power level determined based on the pathloss value estimated by the CLI measurement measured at slot 320. In some cases, the power level used by UE 115-e for uplink transmission in third time period 330 may be sufficiently low to mitigate detrimental effects on UE 115-f from CLI.

In some examples, at slot 335, UE 115-f may receive a downlink transmission that contains an indication of CLI reciprocity and configures resources for a CLI measurement at slot 340. At slot 340, UE 115-f may measure the CLI from UE 115-e. UE 115-f may determine a pathloss value for the pathloss between UE 115-e and UE 115-f base on the CLI measurement measured at slot 340. UE may determine a transmission power level base on the determined pathloss value for a future uplink transmission.

At a fourth time period 345, UE 115-f may be configured with resources for an uplink transmission. UE 115-f may transmit an uplink transmission during fourth time period 345 using the transmission power level determined based on the pathloss value estimated by the CLI measurement measured at slot 340. In some cases, the power level used by UE 115-f for the uplink transmission in fourth time period 345 may be sufficiently low to mitigate detrimental effects on UE 115-e from CLI.

Figure 4:
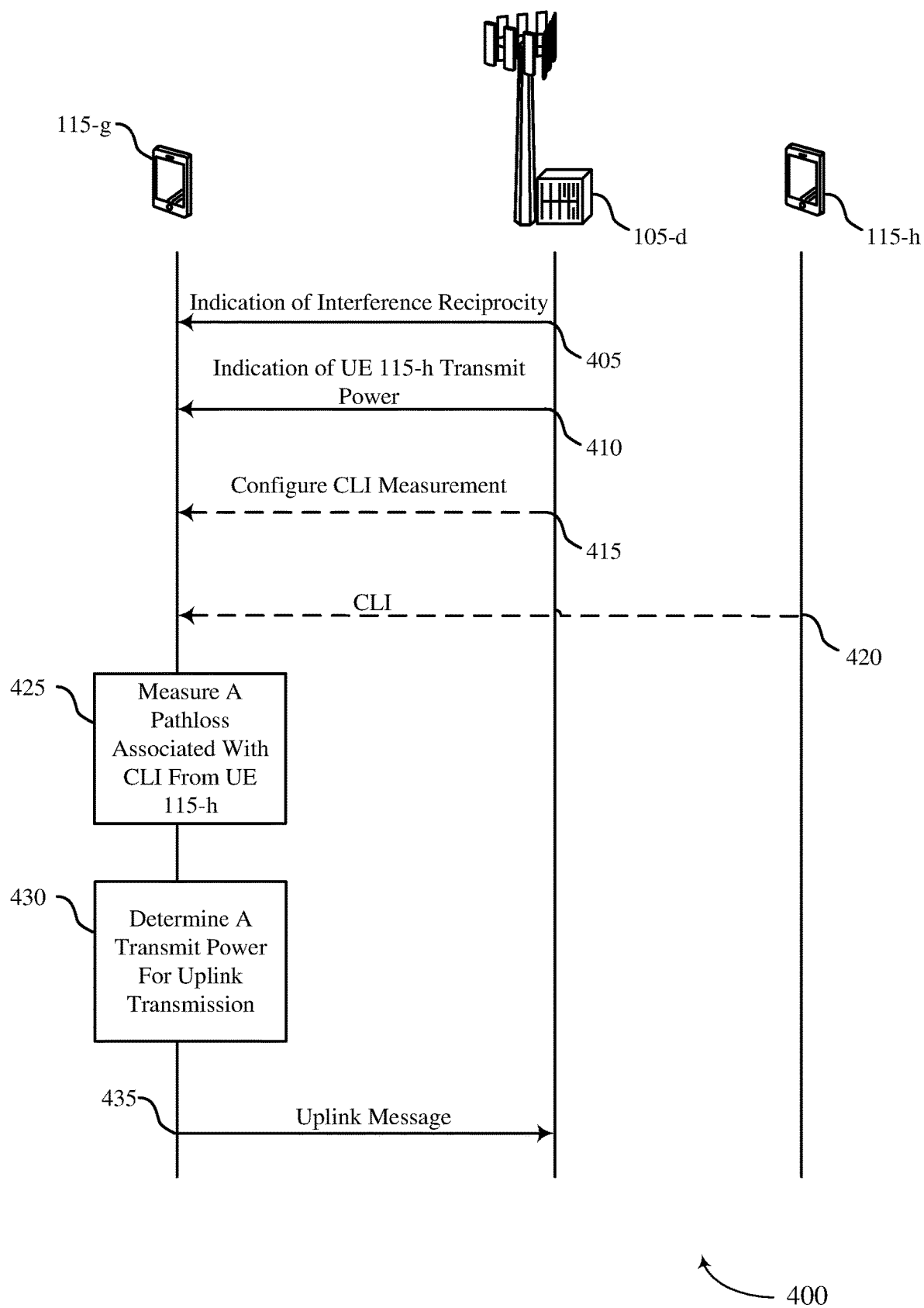
FIG. 4 illustrates an example of a process flow that supports power control based on reciprocity for CLI in accordance with aspects of the present disclosure.

FIG. 4 illustrates an example of a process flow 400 that supports power control based on reciprocity for CLI in accordance with aspects of the present disclosure. In some examples, process flow 400 may implement aspects of wireless communications system 100, wireless communications system 200-a, and wireless communications system 200-b. Process flow 400 may include UE 115-g and UE 115-h, which may be examples of UE 115 as described with reference to FIG. 1. Process flow 400 may include base station 105-d, which may be an example of base station 105 as described with reference to FIG. 1. Base station 105-d, UE 115-g, and UE 115-h may communicate to perform power control to reduce CLI reciprocity between UE 115-g and UE 115-h.

At 405, UE 115-g may receive, from base station 105-d, a configuration indicating an interference reciprocity between the first UE and a second UE, the interference reciprocity associated with CLI between UE 115-g and UE 115-h. In some cases, UE 115-g may receive a configuration indicating an interference reciprocity between the first UE and the second UE that includes a first symbol and a second symbol associated with the CLI. In this case, UE 115-g may measure the pathloss associated with the CLI between UE 115-g and 115-h in the first symbol and transmit at least one of the uplink messages in the second symbol.

At 410, UE 115-g may receive, from base station 105-d, an indication of a configured transmit power of UE 115-h based on the CLI between UE 115-g and UE 115-h.

At 415, UE 115-g may receive, from base station 105-d, a configuration for resources to perform a CLI measurement.

At 420, UE 115-g may receive, from UE 115-h, CLI from an uplink transmission, transmitted by UE 115-h.

At 425, UE 115-g may measure a pathloss associated with the CLI between the UE 115-g and UE 115-h based on the configured transmit power. In some examples, UE 115-g may determine a resource associated with the CLI between UE 115-g and 115-h based at least in part on the configuration, perform an interference measurement on the resource, and determine the pathloss between UE 115-g and UE 115-h based on the interference measurement of the resource. In some examples, UE 115-g may determine a difference between the configured transmit power of the UE and interference measurement performed on the resource. In some cases, UE 115-g may perform the interference measurement by measuring the RSRP associated with the UE 115-h on the resource.

In some examples, UE 115-g may determine resources associated with CLI with multiple other UEs. In this example, UE 115-g may determine multiple pathloss values associated with CLI between the UE and the multiple UEs based on the resources, wherein each of the multiple pathloss values corresponds to one of the multiple UEs. UE 115-g may then determine the pathloss based on the multiple pathloss values. In some cases, UE 115-g may determine the pathloss values by averaging the pathloss values of the multiple UEs in the dB domain. In some cases, UE 115-g may determine the pathloss to be an average pathloss value of the multiple pathloss values in a linear domain and convert the average pathloss value in the linear domain to the dB domain.

In some examples, UE 115-g may identify a pathloss coefficient based at least in part on the CLI and determine the transmit power based at least in part on the measured pathloss and the pathloss coefficient.

At 430, UE 115-g may determine a transmit power for transmission of one or more uplink messages by the first UE based on the measured pathloss. In some cases, UE 115-g may determine the transmit power based on the signal type associated with the one or more uplink messages, wherein the signal type comprises one of an uplink data channel, an uplink control channel, a reference signal, or a random access channel. In some cases, UE 115-g may determine the transmit power by adjusting the transmit power from a first value to a second value greater than the first value based at least in part on the measured pathloss exceeding a pathloss threshold. In some cases, UE 115-g may determine the transmit power by adjusting the transmit power from a first value to a second value less than the first value based on the measured pathloss being below a pathloss threshold.

Figure 5:
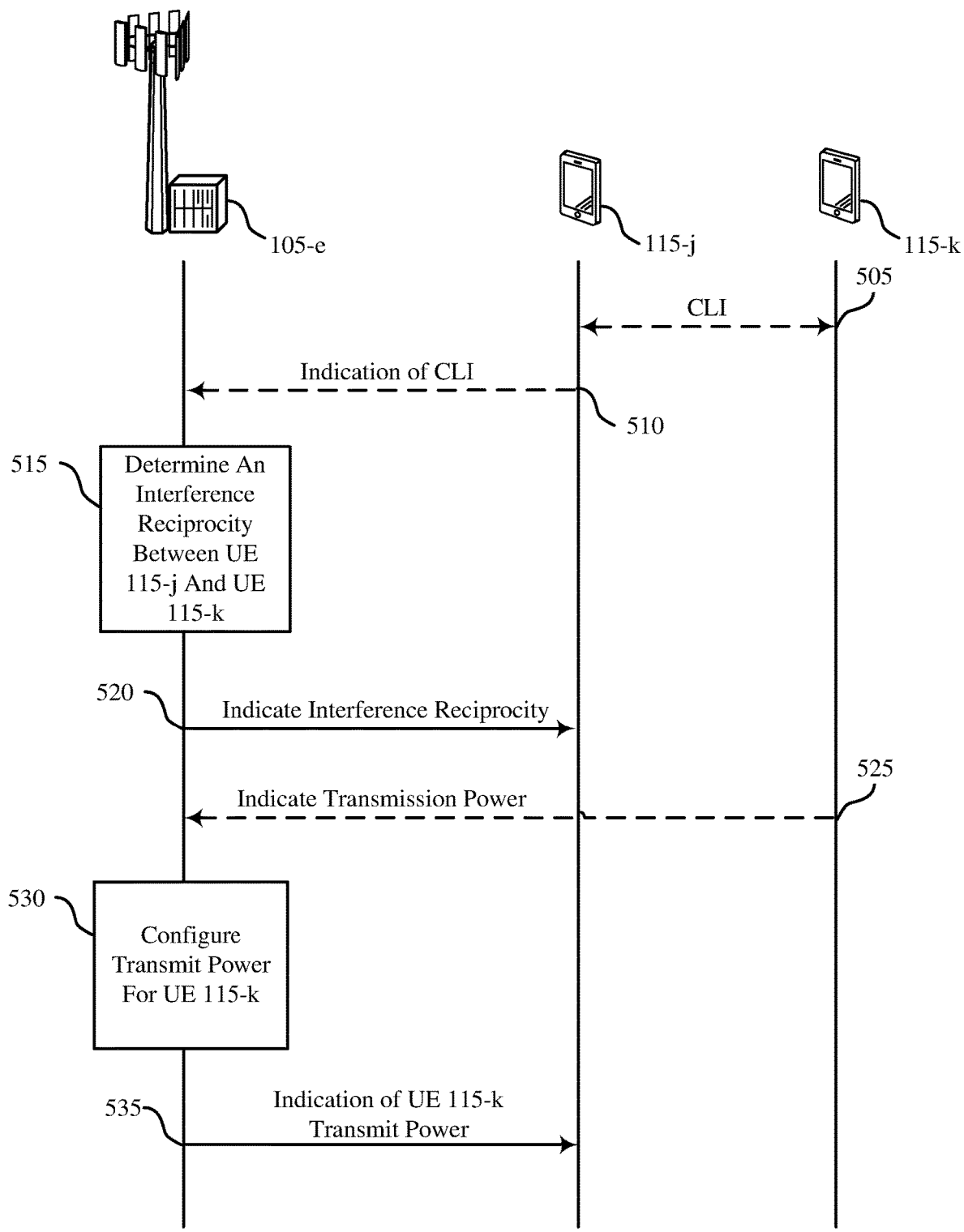
FIG. 5 illustrates an example of a process flow that supports power control based on reciprocity for CLI in accordance with aspects of the present disclosure.

At 435, UE 115-g may transmit the one or more uplink messages in accordance with the determined transmit power FIG. 5 illustrates an example of a process flow 500 that supports power control based on reciprocity for CLI in accordance with aspects of the present disclosure. In some examples, process flow 500 may implement aspects of wireless communications system 100, wireless communications system 200-a, and wireless communications system 200-b. Process flow 500 may include UE 115-j and UE 115-k, which may be examples of UE 115 as described with reference to FIG. 1. Process flow 500 may include base station 105-e, which may be an example of base station 105 as described with reference to FIG. 1. Base station 105-e, UE 115-j, and UE 115-k may communicate to perform power control to reduce CLI reciprocity between UE 115-j and UE 115 k. In some cases, UE 115-j and UE 115-k may be served by the same base station 105, such as base station 105-e, and be in the same serving sell. In other cases, UE 115-j and UE 115-k may be served by different base stations 105 and be in different serving cells.

At 505, UE 115-j and UE 115-k may experience CLI reciprocity. At a first point in time, UE 115-j may be configured for an uplink transmission while UE 115-k may be configured for a downlink transmission. At this first point in time, the uplink transmission from UE 115-j may interfere with the downlink transmission for UE 115-k via CLI. At a second point in time, UE 115-j may be configured for a downlink transmission while UE 115-k may be configured for an uplink transmission. At this first point in time, the uplink transmission from UE 115-k may interfere with the downlink transmission for UE 115-j via CLI.

At 510, in some examples, base station 105-e may receive an indication of CLI from UE 115-j. Alternatively, base station 105-e may receive an indication of CLI from UE 115-k. Alternatively, base station 105-e may determine a potential for CLI between UE 115-j and UE 115-k based off of conflicting time-frequency resource configurations.

At 515, base station 105-e may determine an interference reciprocity between UE 115-j and UE 115-k, where the interference reciprocity is associated with CLI between UE 115-j and UE 115-k. In some examples, base station 105-e may determine an inference reciprocity between UE 115-j and UE 115-k based at least in part on an indication of CLI transmitted by UE 115-j at 510. In some other examples, base station 105-e may determine an interference reciprocity between UE 115-j and UE 115-k based on conflicting time-frequency resource configurations.

At 520, base station 105-e may transmit, to UE 115-j a configuration indicating the interference reciprocity between UE 115-j and UE 115-k. In some cases, base station 105-e may transmit, in the configuration, a set of resources associated with the CLI between UE 115-j and UE 115-k. In some cases, base station 105-e may transmit the configuration via radio resource control (RRC) signaling, medium access control (MAC) control element (MAC-CE), or downlink control information (DCI).

At 525, in some examples, base station 105-e may receive an indication of the transmit power used by UE 115-k. If base station 105-e is the serving base station for UE 115-k, UE 115-k may send an indication of transmit power to base station 105-e. If base station 105-e is not the serving base station 105 for UE 115-e, base station 105-e may receive an indication of the transmit power of UE 115-k from the base station 105 that serves UE 115-k of the network.

At 530, base station 105-e may configure a transmit power for UE 115-k based at least in part on the CLI between UE 115-j and UE 115-k.

At 535, base station 105-e may transmit, to UE 115-j, an indication of the configured transmit power for UE 115-k. In some cases, base station 105-e may transmit the indication of the configured transmit power for the second UE via RRC signaling, MAC-CE, or DCI.

Figure 6:
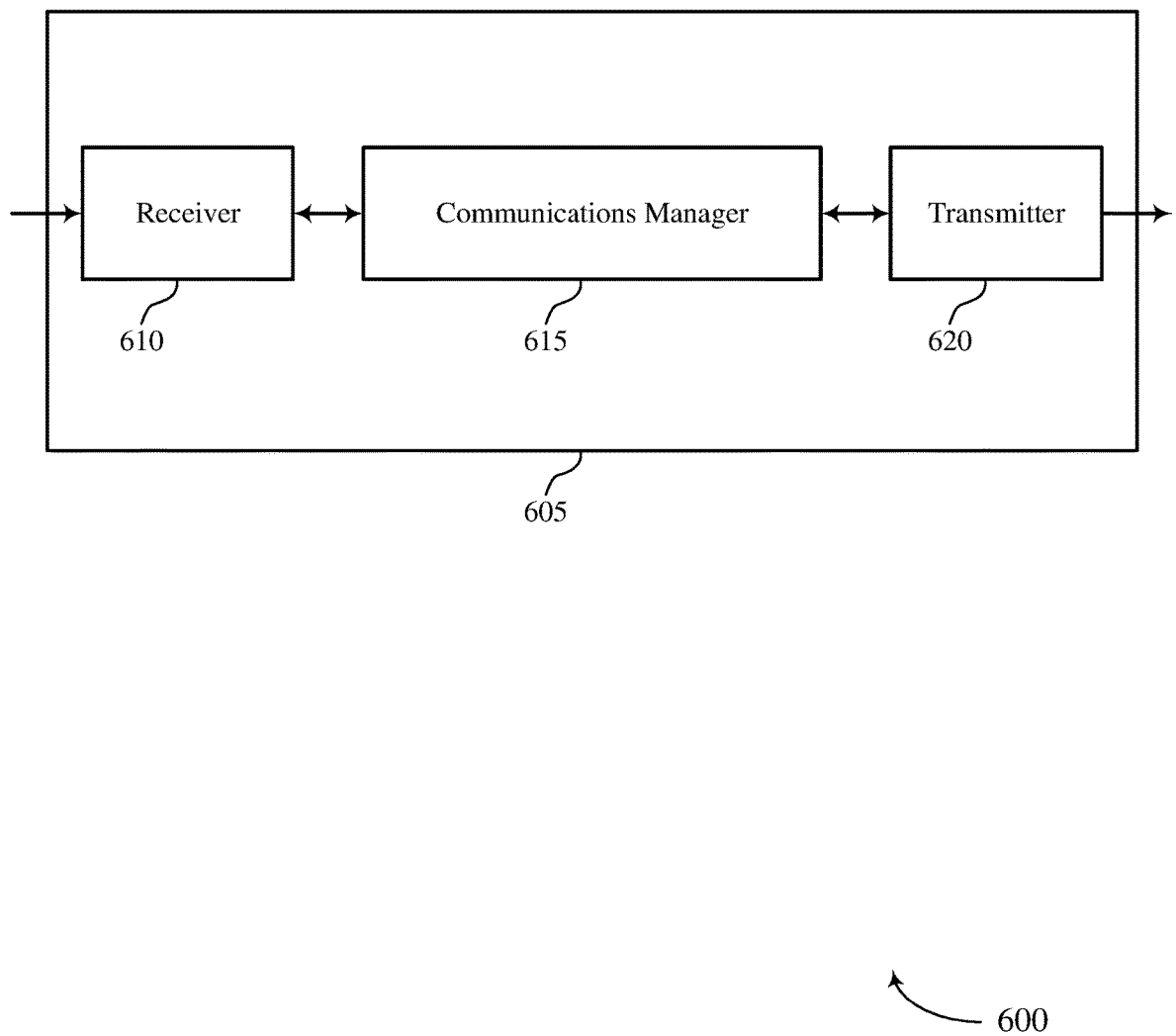
FIGS. 6 and 7 show block diagrams of devices that support power control based on reciprocity for CLI in accordance with aspects of the present disclosure.

FIG. 6 shows a block diagram 600 of a device 605 that supports power control based on reciprocity for CLI in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to power control based on reciprocity for CLI, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration indicating an interference reciprocity between the first UE and a second UE, the interference reciprocity associated with CLI between the first UE and the second UE, receive, from the base station, an indication of a configured transmit power of the second UE based on the CLI between the first UE and the second UE, measure a pathloss associated with the CLI between the first UE and the second UE based on the configured transmit power, determine a transmit power for transmission of one or more uplink messages by the first UE based on the measured pathloss, and transmit the one or more uplink messages in accordance with the determined transmit power. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to reduce the CLI transmitted between the device 605 and one or more other wireless communications device. Based on the techniques for reducing the CLI between the device 605 and one or more other wireless communications device, the device 605 may support decreased CLI experienced by other wireless communication devices from uplink transmission from device 605.

As such, the device 605 may decrease the likelihood of performance degradation due to CLI and, accordingly, may communicate with a greater likelihood of successful communication. In some examples, based on a greater likelihood of successful communications, the device 605 may more efficiently power a processor or one or more processing units associated with transmitting and receiving communications, which may enable the device to save power, increase batter life, and increase communication speed.

Figure 7:
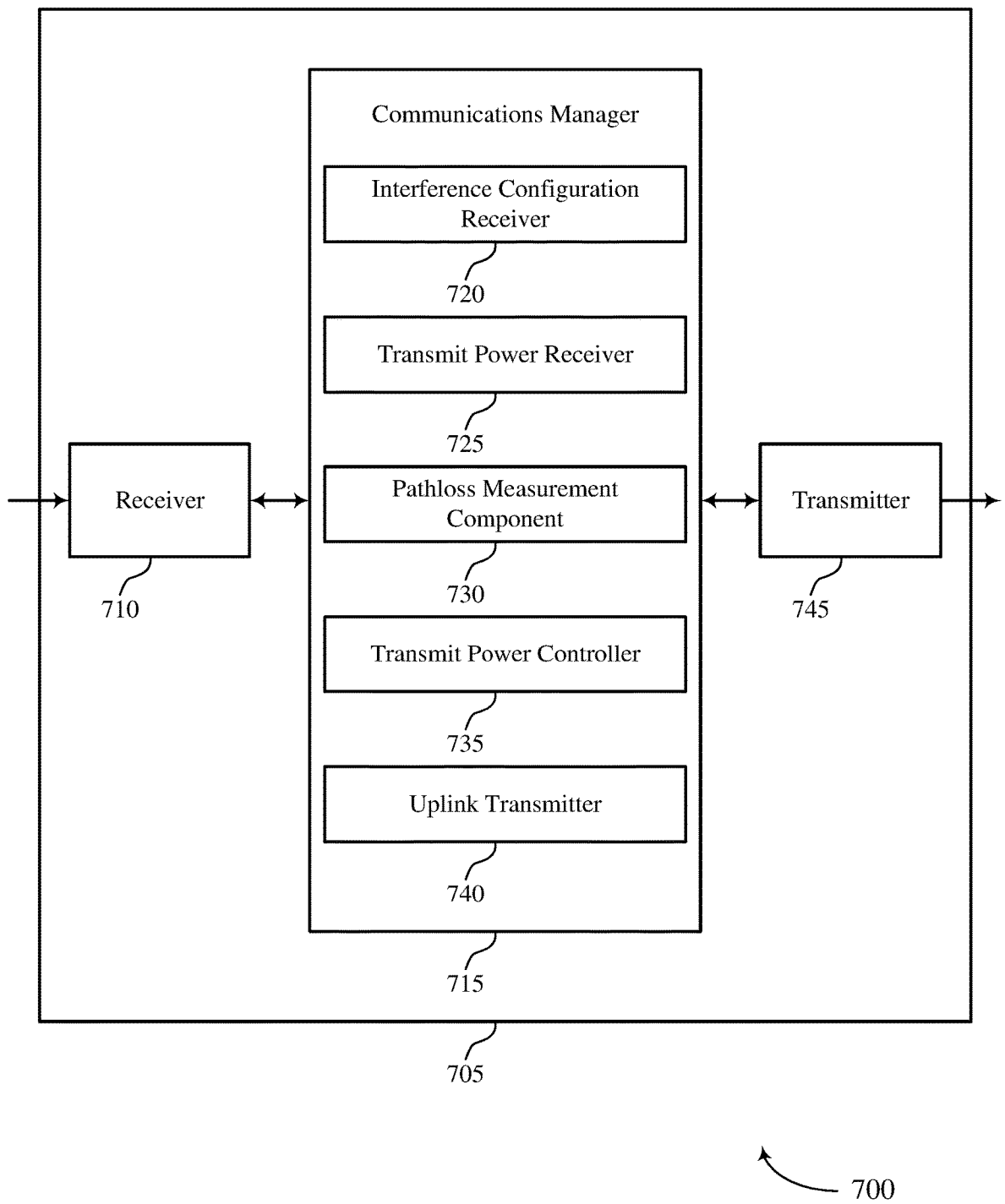

FIG. 7 shows a block diagram 700 of a device 705 that supports power control based on reciprocity for CLI in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to power control based on reciprocity for CLI, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an interference configuration receiver 720, a transmit power receiver 725, a pathloss measurement component 730, a transmit power controller 735, and an uplink transmitter 740. The communications manager 715 may be an example of aspects of the communications manager 910 described herein.

The Interference Configuration Receiver 720 may receive, from a base station, a configuration indicating an interference reciprocity between the first UE and a second UE, the interference reciprocity associated with CLI between the first UE and the second UE.

The Transmit Power Receiver 725 may receive, from the base station, an indication of a configured transmit power of the second UE based on the CLI between the first UE and the second UE.

The Pathloss Measurement Component 730 may measure a pathloss associated with the CLI between the first UE and the second UE based on the configured transmit power.

The Transmit Power Controller 735 may determine a transmit power for transmission of one or more uplink messages by the first UE based on the measured pathloss.

The Uplink Transmitter 740 may transmit the one or more uplink messages in accordance with the determined transmit power.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
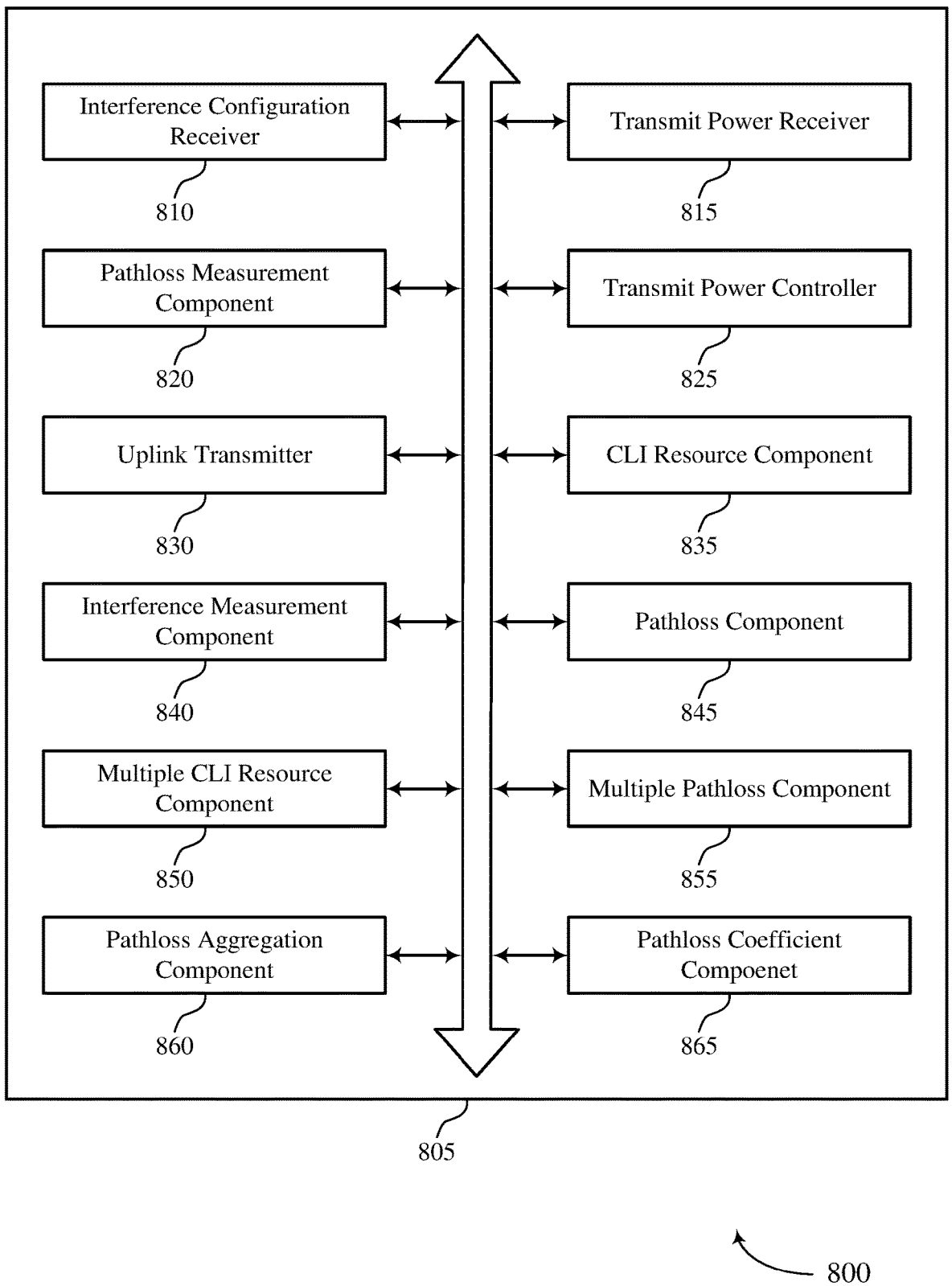
FIG. 8 shows a block diagram of a communications manager that supports power control based on reciprocity for CLI in accordance with aspects of the present disclosure.

FIG. 8 shows a block diagram 800 of a communications manager 805 that supports power control based on reciprocity for CLI in accordance with aspects of the present disclosure. The communications manager 805 may be an example of aspects of a communications manager 615, a communications manager 715, or a communications manager 910 described herein. The communications manager 805 may include an interference configuration receiver 810, a transmit power receiver 815, a pathloss measurement component 820, a transmit power controller 825, an uplink transmitter 830, a CLI resource component 835, an interference measurement component 840, a pathloss component 845, a multiple CLI resource component 850, a multiple pathloss component 855, a pathloss aggregation component 860, and a pathloss coefficient component 865. Each of these modules may communicate, directly or indirectly, with one another (e.g., via one or more buses).

The Interference Configuration Receiver 810 may receive, from a base station, a configuration indicating an interference reciprocity between the first UE and a second UE, the interference reciprocity associated with CLI between the first UE and the second UE.

The Transmit Power Receiver 815 may receive, from the base station, an indication of a configured transmit power of the second UE based on the CLI between the first UE and the second UE.

The Pathloss Measurement Component 820 may measure a pathloss associated with the CLI between the first UE and the second UE based on the configured transmit power.

In some examples, the Pathloss Measurement Component 820 may measure the pathloss associated with the CLI between the first UE and the second UE in the first symbol.

The Transmit Power Controller 825 may determine a transmit power for transmission of one or more uplink messages by the first UE based on the measured pathloss.

In some examples, the Transmit Power Controller 825 may determine the transmit power based on the measure pathloss and the pathloss coefficient.

In some examples, determining the transmit power based on the signal type associated with the one or more uplink messages, where the signal type includes one of an uplink data channel, an uplink control channel, a reference signal, or a random access channel.

In some examples, the Transmit Power Controller 825 may adjust the transmit power from a first value to a second value greater than the first value based on the measured pathloss exceeding a pathloss threshold.

In some examples, the Transmit Power Controller 825 may adjust the transmit power from a first value to a second value less than the first value based on the measured pathloss being below a pathloss threshold.

The Uplink Transmitter 830 may transmit the one or more uplink messages in accordance with the determined transmit power.

In some examples, the Uplink Transmitter 830 may transmit at least one of the one or more uplink messages in the second symbol.

The CLI Resource Component 835 may determine a resource associated with the CLI between the first UE and the second UE based on the configuration.

The Interference Measurement Component 840 may perform an interference measurement on the resource.

In some examples, the Interference Measurement Component 840 may measure a RSRP associated with the second UE on the resource.

In some cases, the interference measurement is performed using a same spatial filter used for transmission of the one or more uplink messages.

The Pathloss Component 845 may determine the pathloss between the first UE and the second UE based on the interference measurement on the resource.

In some examples, the Pathloss Component 845 may determine a difference between the configured transmit power of the UE and the interference measurement performed on the resource.

The Multiple CLI Resource Component 850 may determine resources associated with CLI between the UE and multiple UEs.

The Multiple Pathloss Component 855 may determine multiple pathloss values associated with CLI between the UE and the multiple UEs based on the resources, where each of the multiple pathloss values corresponds to a respective one of the multiple UEs.

The Pathloss Aggregation Component 860 may determine the pathloss based on the multiple pathloss values.

In some examples, the Pathloss Aggregation Component 860 may determine the pathloss to be a minimum pathloss value of the multiple pathloss values.

In some examples, the Pathloss Aggregation Component 860 may determine the pathloss to be an average pathloss value of the multiple pathloss values in a dB domain.

In some examples, the Pathloss Aggregation Component 860 may determine the pathloss to be an average pathloss value of the multiple pathloss values in a linear domain.

In some examples, the Pathloss Aggregation Component 860 may convert the average pathloss value of the multiple pathloss values in the linear domain to the dB domain.

The Pathloss Coefficient Component 865 may identify a pathloss coefficient based on the CLI.

Figure 9:
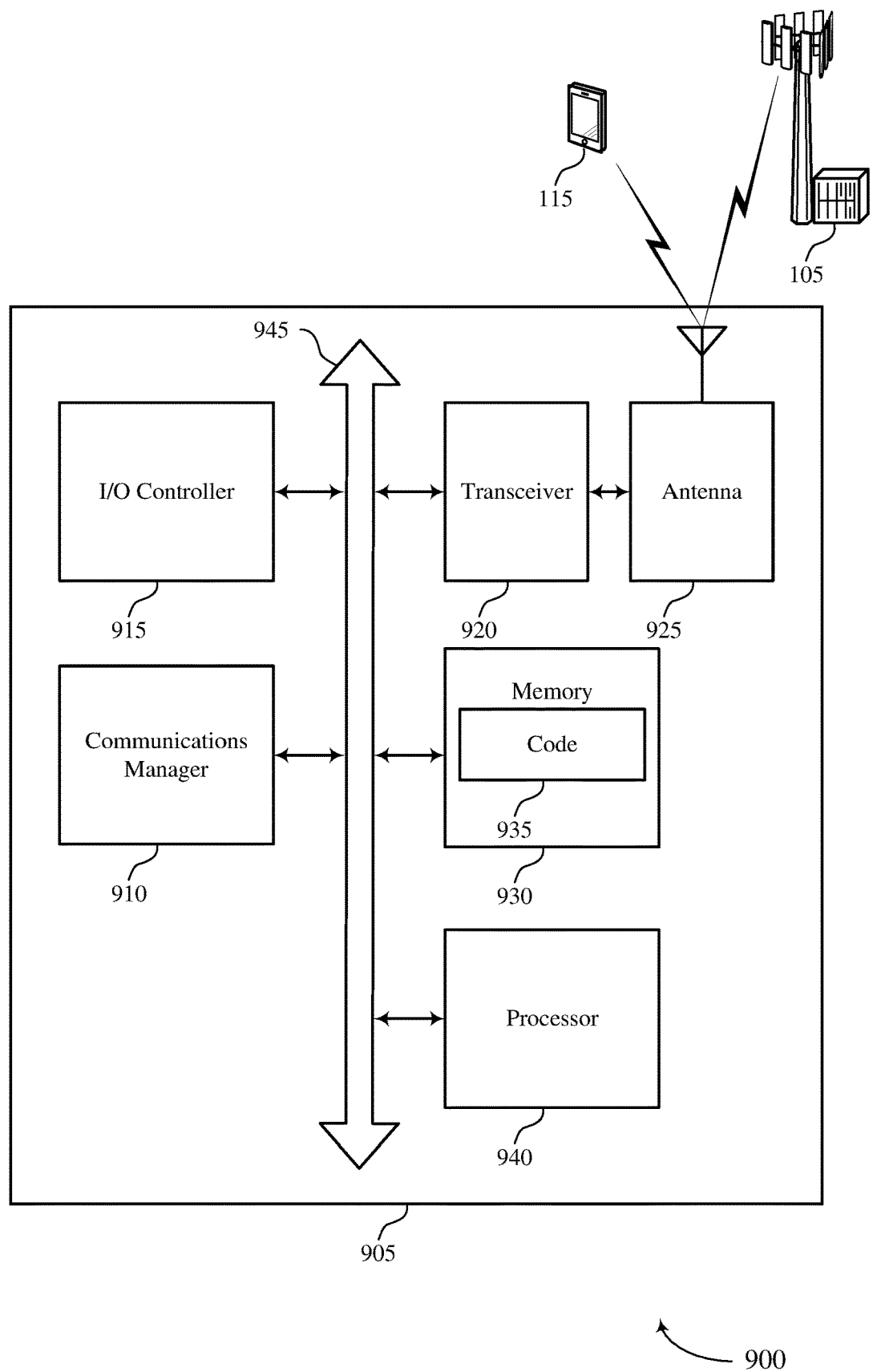
FIG. 9 shows a diagram of a system including a device that supports power control based on reciprocity for CLI in accordance with aspects of the present disclosure.

FIG. 9 shows a diagram of a system 900 including a device 905 that supports power control based on reciprocity for CLI in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration indicating an interference reciprocity between the first UE and a second UE, the interference reciprocity associated with CLI between the first UE and the second UE, receive, from the base station, an indication of a configured transmit power of the second UE based on the CLI between the first UE and the second UE, measure a pathloss associated with the CLI between the first UE and the second UE based on the configured transmit power, determine a transmit power for transmission of one or more uplink messages by the first UE based on the measured pathloss, and transmit the one or more uplink messages in accordance with the determined transmit power.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting power control based on reciprocity for CLI).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
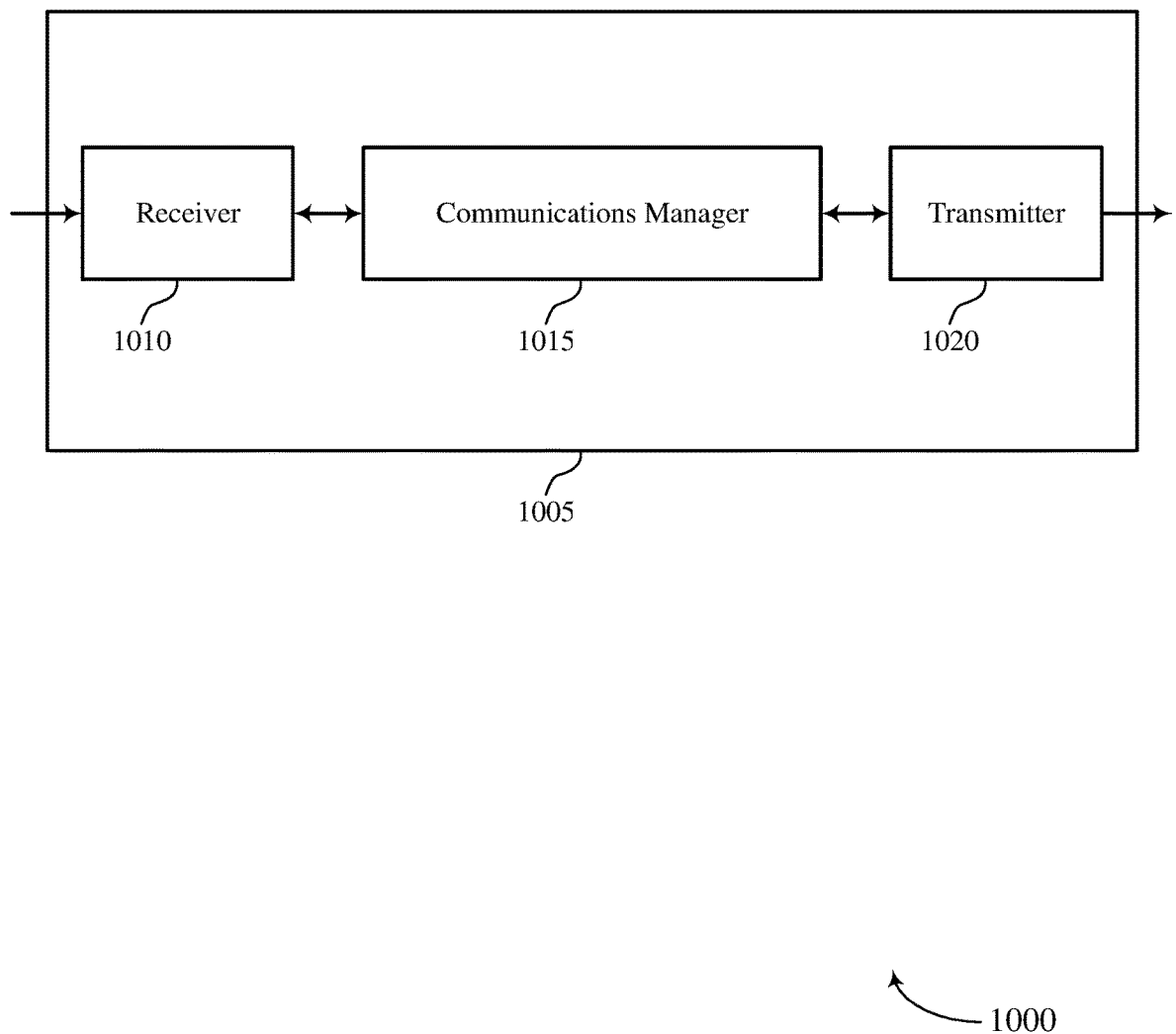
FIGS. 10 and 11 show block diagrams of devices that support power control based on reciprocity for CLI in accordance with aspects of the present disclosure.

FIG. 10 shows a block diagram 1000 of a device 1005 that supports power control based on reciprocity for CLI in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to power control based on reciprocity for CLI, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine an interference reciprocity between a first UE and a second UE, the interference reciprocity associated with CLI between the first UE and the second UE, transmit, to the first UE, a configuration indicating the interference reciprocity between the first UE and a second UE, configure a transmit power for the second UE based on the CLI, and transmit, to the first UE, an indication of the configured transmit power for the second UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
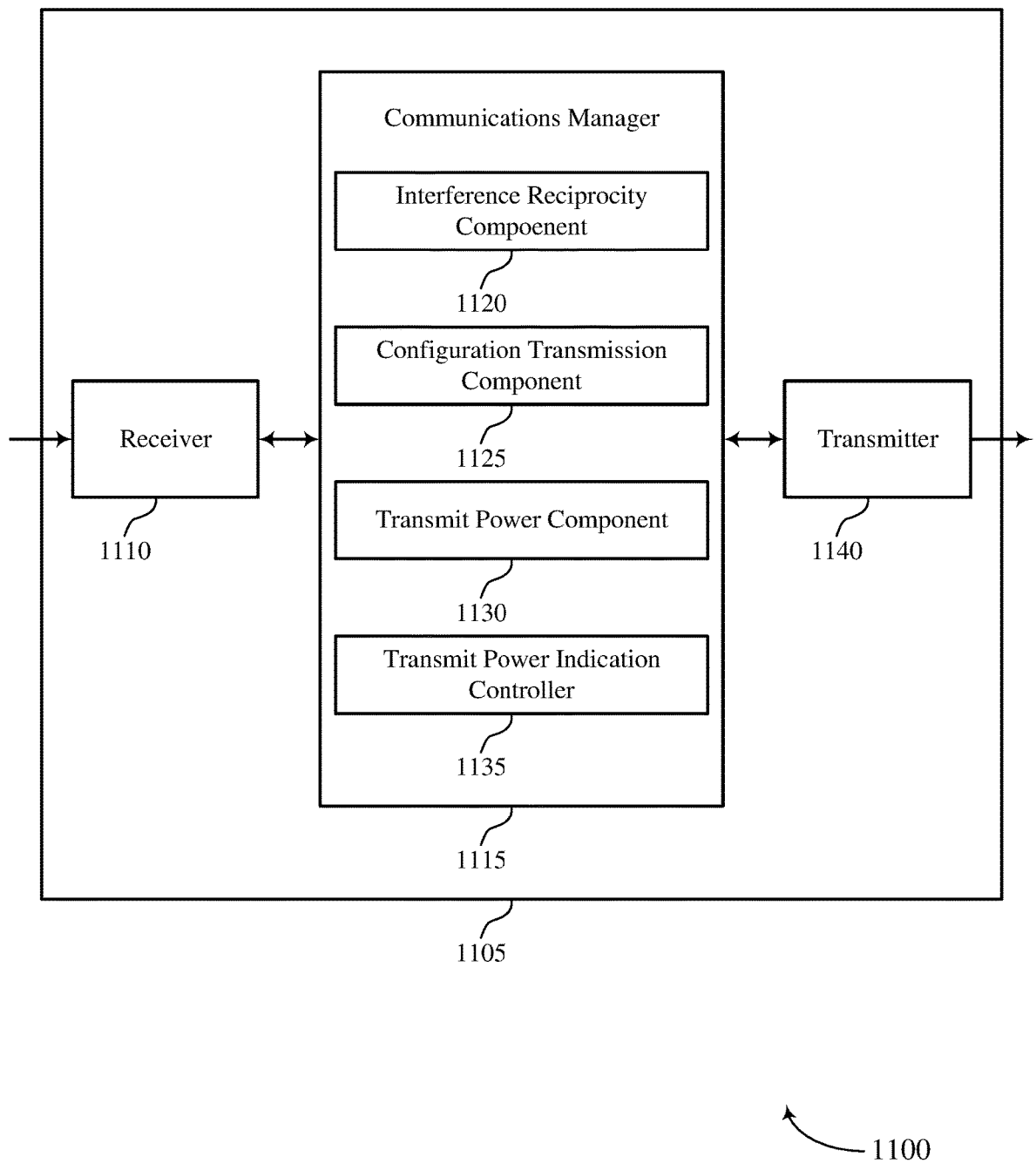

FIG. 11 shows a block diagram 1100 of a device 1105 that supports power control based on reciprocity for CLI in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to power control based on reciprocity for CLI, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an interference reciprocity component 1120, a configuration transmission component 1125, a transmit power component 1130, and a transmit power indication controller 1135. The communications manager 1115 may be an example of aspects of the communications manager 1310 described herein.

The Interference Reciprocity Component 1120 may determine an interference reciprocity between a first UE and a second UE, the interference reciprocity associated with CLI between the first UE and the second UE.

The Configuration Transmission Component 1125 may transmit, to the first UE, a configuration indicating the interference reciprocity between the first UE and a second UE.

The Transmit Power Component 1130 may configure a transmit power for the second UE based on the CLI.

The Transmit Power Indication Controller 1135 may transmit, to the first UE, an indication of the configured transmit power for the second UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
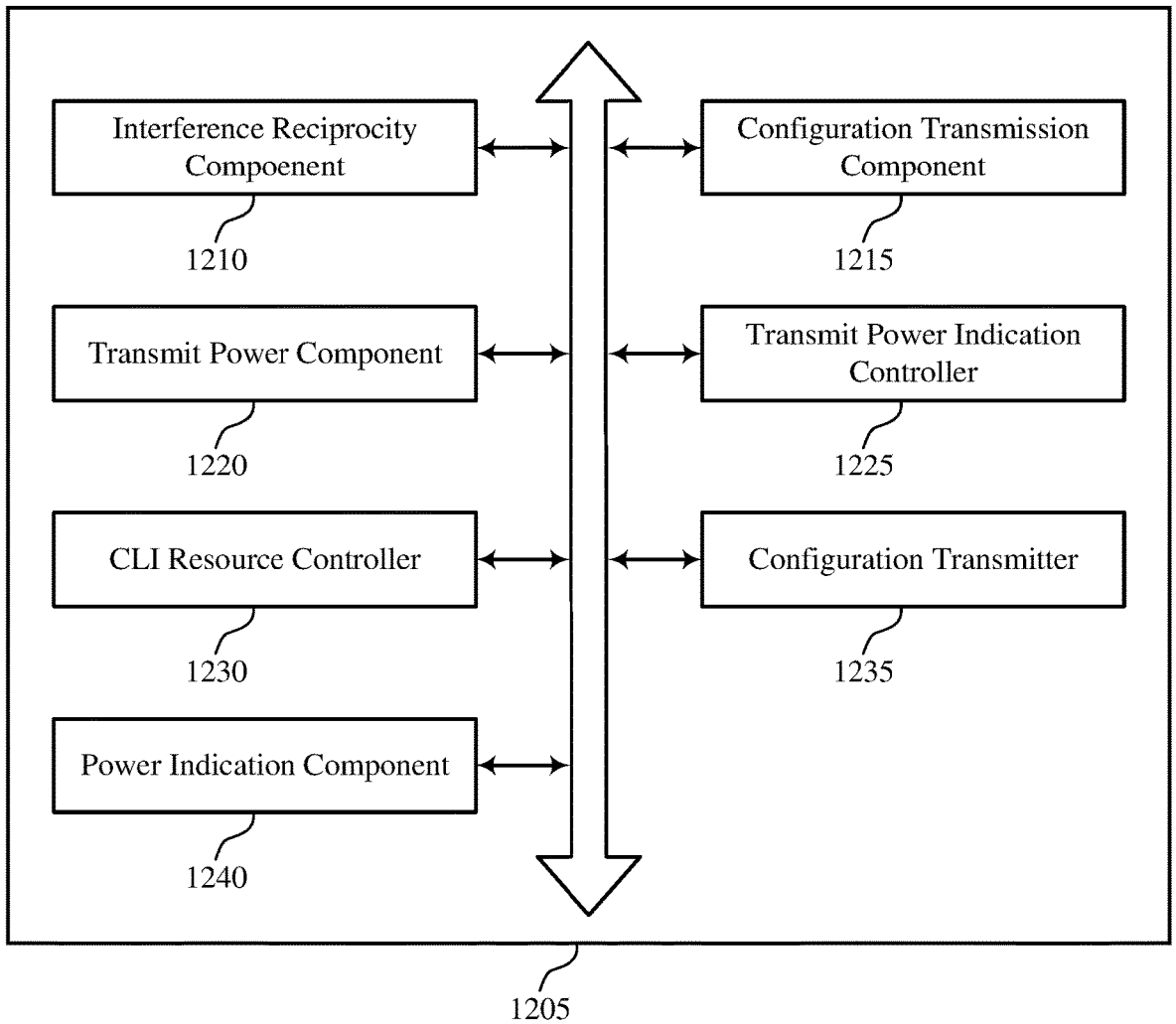
FIG. 12 shows a block diagram of a communications manager that supports power control based on reciprocity for CLI in accordance with aspects of the present disclosure.

FIG. 12 shows a block diagram 1200 of a communications manager 1205 that supports power control based on reciprocity for CLI in accordance with aspects of the present disclosure. The communications manager 1205 may be an example of aspects of a communications manager 1015, a communications manager 1115, or a communications manager 1310 described herein. The communications manager 1205 may include an interference reciprocity component 1210, a configuration transmission component 1215, a transmit power component 1220, a transmit power indication controller 1225, a CLI resource controller 1230, a configuration transmitter 1235, and a power indication component 1240. Each of these modules may communicate, directly or indirectly, with one another (e.g., via one or more buses).

The Interference Reciprocity Component 1210 may determine an interference reciprocity between a first UE and a second UE, the interference reciprocity associated with CLI between the first UE and the second UE.

The Configuration Transmission Component 1215 may transmit, to the first UE, a configuration indicating the interference reciprocity between the first UE and a second UE.

The Transmit Power Component 1220 may configure a transmit power for the second UE based on the CLI.

The Transmit Power Indication Controller 1225 may transmit, to the first UE, an indication of the configured transmit power for the second UE.

The CLI Resource Controller 1230 may transmit, in the configuration, a set of resources associated with the CLI between the first UE and the second UE.

The Configuration Transmitter 1235 may transmit the configuration via RRC signaling, MAC-CE, or DCI.

The Power Indication Component 1240 may transmit the indication of the configured transmit power for the second UE via RRC signaling, MAC-CE, or DCI.

Figure 13:
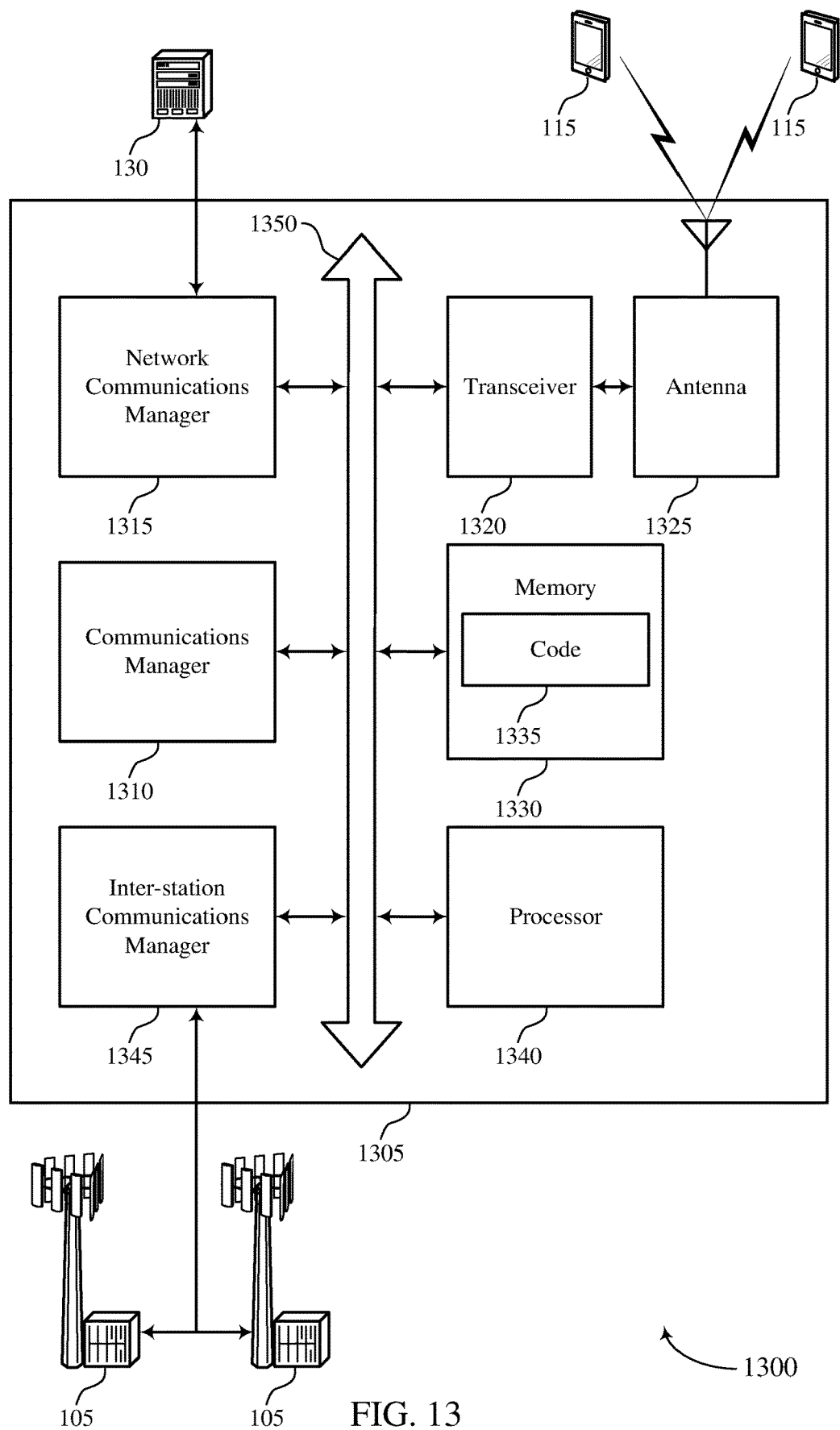
FIG. 13 shows a diagram of a system including a device that supports power control based on reciprocity for CLI in accordance with aspects of the present disclosure.

FIG. 13 shows a diagram of a system 1300 including a device 1305 that supports power control based on reciprocity for CLI in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine an interference reciprocity between a first UE and a second UE, the interference reciprocity associated with CLI between the first UE and the second UE, transmit, to the first UE, a configuration indicating the interference reciprocity between the first UE and a second UE, configure a transmit power for the second UE based on the CLI, and transmit, to the first UE, an indication of the configured transmit power for the second UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting power control based on reciprocity for CLI).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
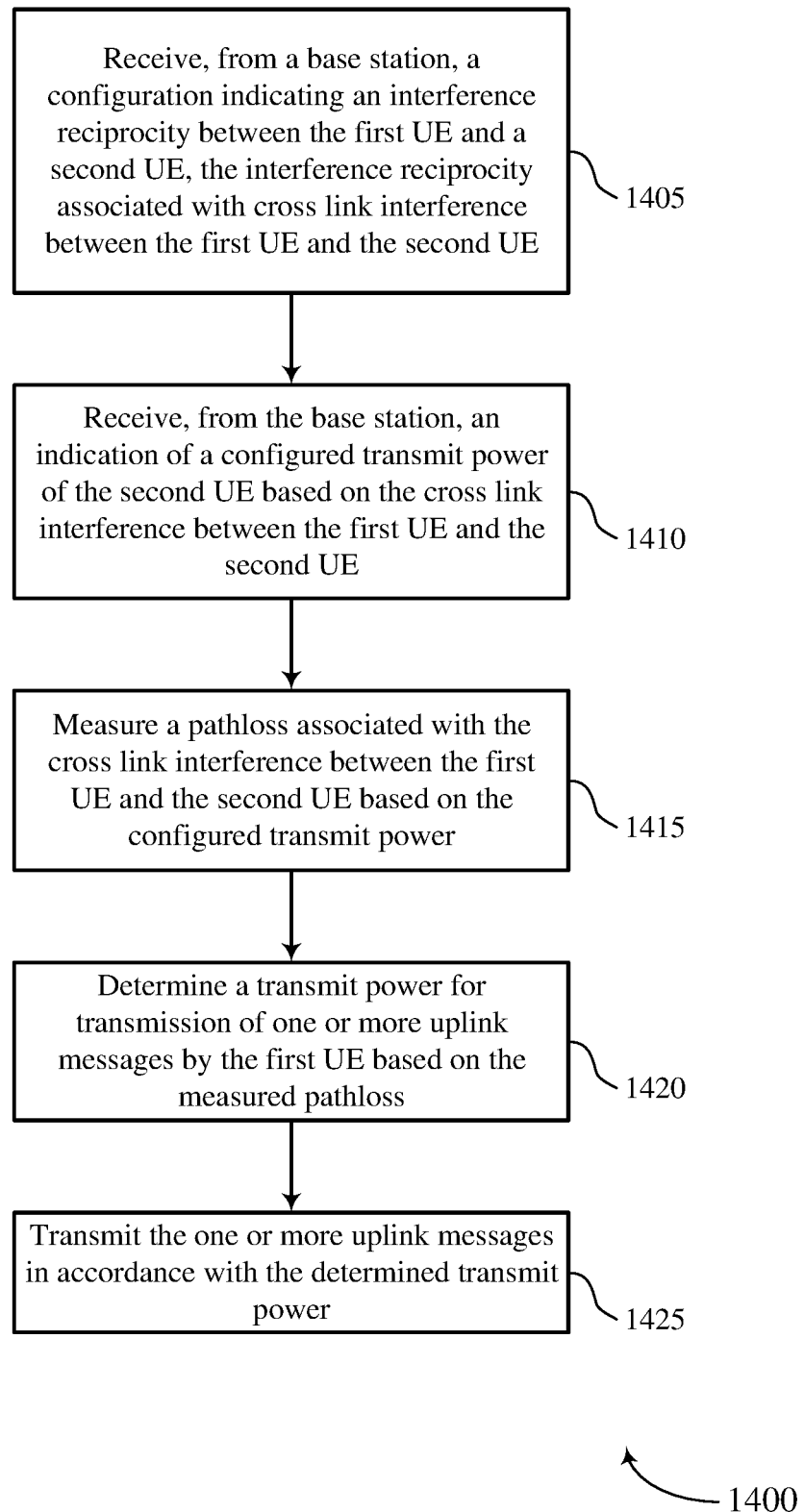
FIGS. 14 through 18 show flowcharts illustrating methods that support power control based on reciprocity for CLI in accordance with aspects of the present disclosure.

FIG. 14 shows a flowchart illustrating a method 1400 that supports power control based on reciprocity for CLI in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a configuration indicating an interference reciprocity between the first UE and a second UE, the interference reciprocity associated with CLI between the first UE and the second UE. The operations of 1405 may be performed according to the methods described herein. In some examples, aspects of the operations of 1405 may be performed by an Interference Configuration Receiver as described with reference to FIGS. 6 through 9.

At 1410, the UE may receive, from the base station, an indication of a configured transmit power of the second UE based on the CLI between the first UE and the second UE. The operations of 1410 may be performed according to the methods described herein. In some examples, aspects of the operations of 1410 may be performed by a Transmit Power Receiver as described with reference to FIGS. 6 through 9.

At 1415, the UE may measure a pathloss associated with the CLI between the first UE and the second UE based on the configured transmit power. The operations of 1415 may be performed according to the methods described herein. In some examples, aspects of the operations of 1415 may be performed by a Pathloss Measurement Component as described with reference to FIGS. 6 through 9.

At 1420, the UE may determine a transmit power for transmission of one or more uplink messages by the first UE based on the measured pathloss. The operations of 1420 may be performed according to the methods described herein. In some examples, aspects of the operations of 1420 may be performed by a Transmit Power Controller as described with reference to FIGS. 6 through 9.

At 1425, the UE may transmit the one or more uplink messages in accordance with the determined transmit power. The operations of 1425 may be performed according to the methods described herein. In some examples, aspects of the operations of 1425 may be performed by an Uplink Transmitter as described with reference to FIGS. 6 through 9.

Figure 15:
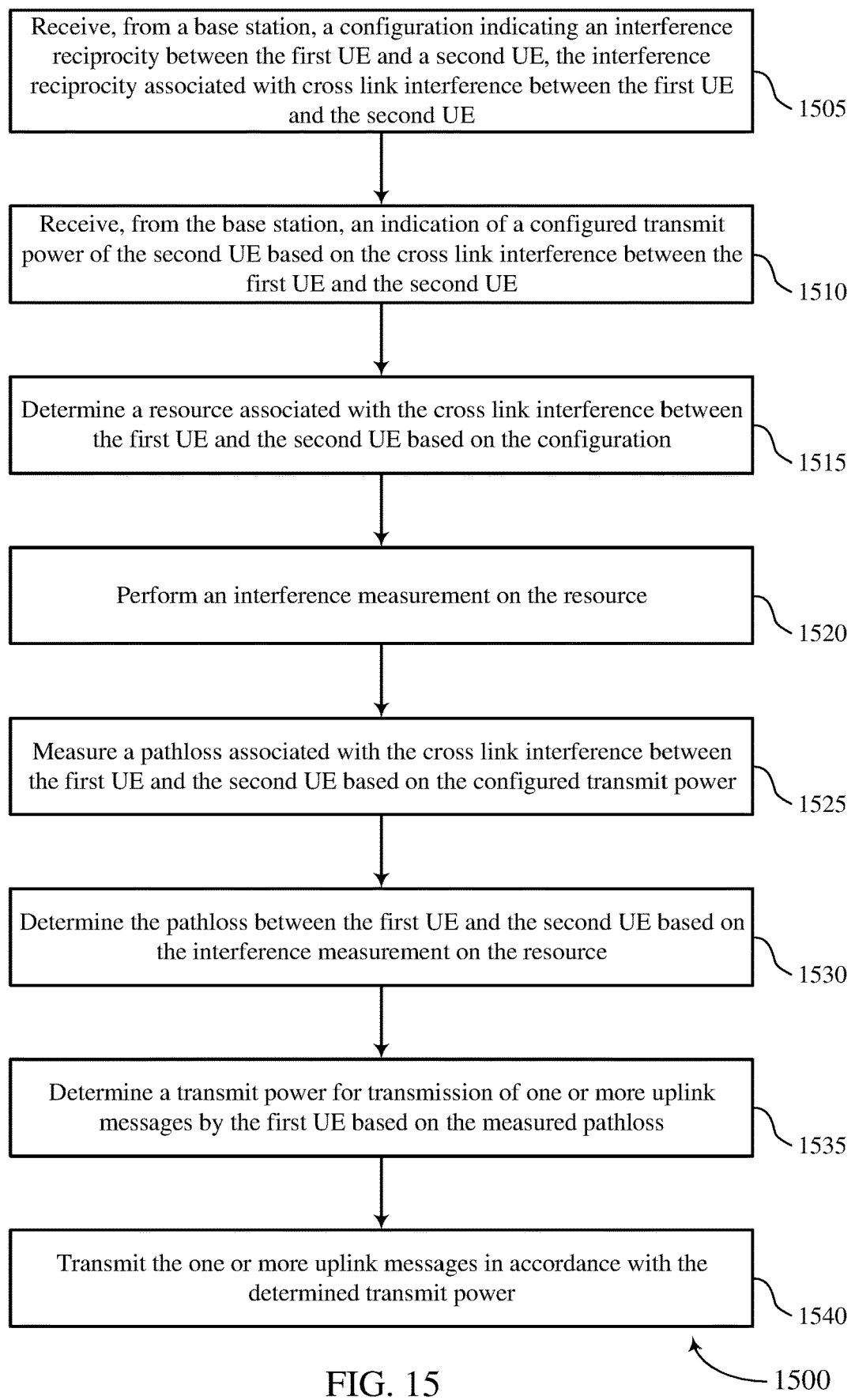

FIG. 15 shows a flowchart illustrating a method 1500 that supports power control based on reciprocity for CLI in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a configuration indicating an interference reciprocity between the first UE and a second UE, the interference reciprocity associated with CLI between the first UE and the second UE. The operations of 1505 may be performed according to the methods described herein. In some examples, aspects of the operations of 1505 may be performed by an Interference Configuration Receiver as described with reference to FIGS. 6 through 9.

At 1510, the UE may receive, from the base station, an indication of a configured transmit power of the second UE based on the CLI between the first UE and the second UE. The operations of 1510 may be performed according to the methods described herein. In some examples, aspects of the operations of 1510 may be performed by a Transmit Power Receiver as described with reference to FIGS. 6 through 9.

At 1515, the UE may determine a resource associated with the CLI between the first UE and the second UE based on the configuration. The operations of 1515 may be performed according to the methods described herein. In some examples, aspects of the operations of 1515 may be performed by a CLI Resource Component as described with reference to FIGS. 6 through 9.

At 1520, the UE may perform an interference measurement on the resource. The operations of 1520 may be performed according to the methods described herein. In some examples, aspects of the operations of 1520 may be performed by an Interference Measurement Component as described with reference to FIGS. 6 through 9.

At 1525, the UE may measure a pathloss associated with the CLI between the first UE and the second UE based on the configured transmit power. The operations of 1525 may be performed according to the methods described herein. In some examples, aspects of the operations of 1525 may be performed by a Pathloss Measurement Component as described with reference to FIGS. 6 through 9.

At 1530, the UE may determine the pathloss between the first UE and the second UE based on the interference measurement on the resource. The operations of 1530 may be performed according to the methods described herein. In some examples, aspects of the operations of 1530 may be performed by a Pathloss Component as described with reference to FIGS. 6 through 9.

At 1535, the UE may determine a transmit power for transmission of one or more uplink messages by the first UE based on the measured pathloss. The operations of 1535 may be performed according to the methods described herein. In some examples, aspects of the operations of 1535 may be performed by a Transmit Power Controller as described with reference to FIGS. 6 through 9.

At 1540, the UE may transmit the one or more uplink messages in accordance with the determined transmit power. The operations of 1540 may be performed according to the methods described herein. In some examples, aspects of the operations of 1540 may be performed by an Uplink Transmitter as described with reference to FIGS. 6 through 9.

Figure 16:
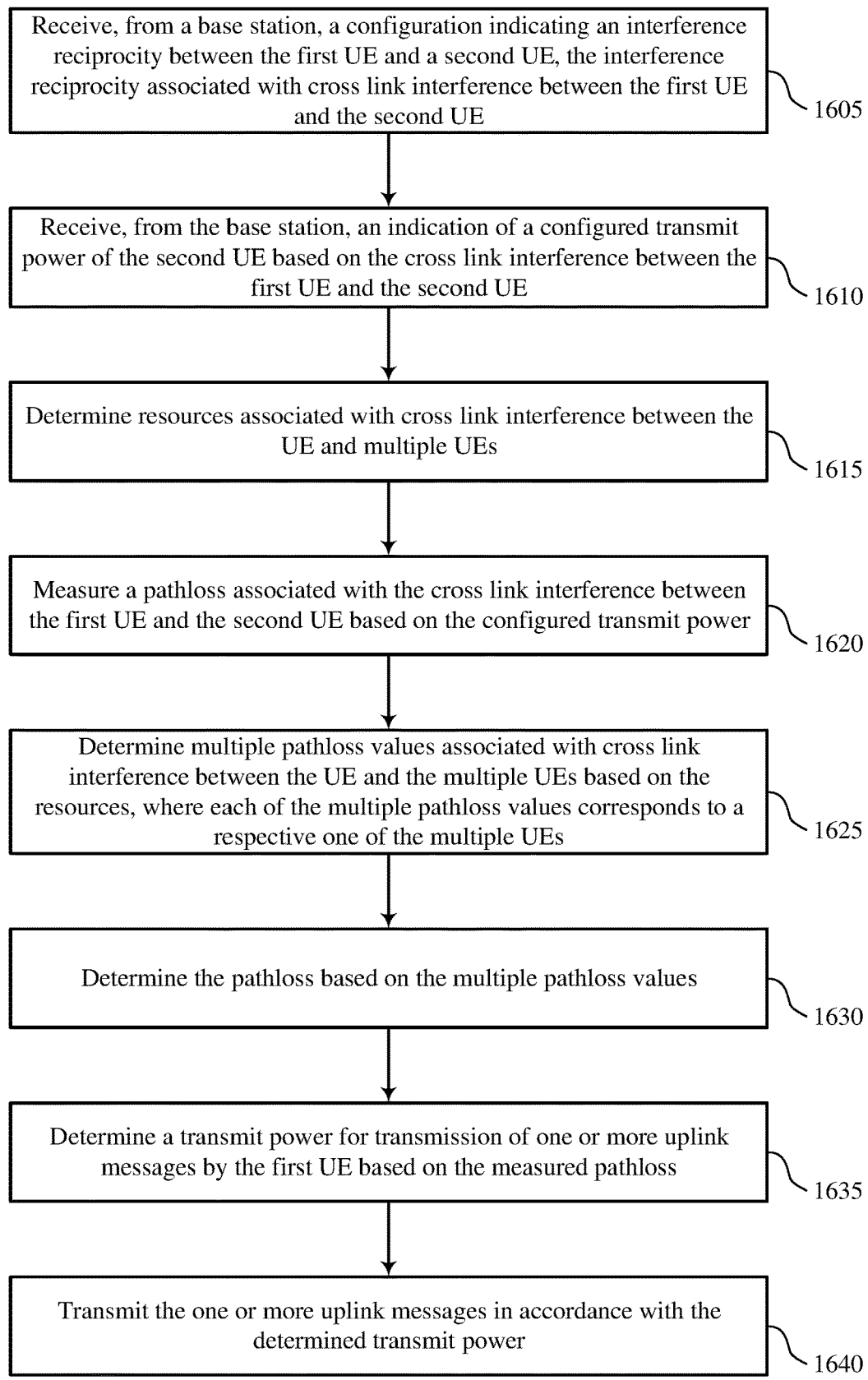

FIG. 16 shows a flowchart illustrating a method 1600 that supports power control based on reciprocity for CLI in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a configuration indicating an interference reciprocity between the first UE and a second UE, the interference reciprocity associated with CLI between the first UE and the second UE. The operations of 1605 may be performed according to the methods described herein. In some examples, aspects of the operations of 1605 may be performed by an Interference Configuration Receiver as described with reference to FIGS. 6 through 9.

At 1610, the UE may receive, from the base station, an indication of a configured transmit power of the second UE based on the CLI between the first UE and the second UE. The operations of 1610 may be performed according to the methods described herein. In some examples, aspects of the operations of 1610 may be performed by a Transmit Power Receiver as described with reference to FIGS. 6 through 9.

At 1615, the UE may determine resources associated with CLI between the UE and multiple UEs. The operations of 1615 may be performed according to the methods described herein. In some examples, aspects of the operations of 1615 may be performed by a Multiple CLI Resource Component as described with reference to FIGS. 6 through 9.

At 1620, the UE may measure a pathloss associated with the CLI between the first UE and the second UE based on the configured transmit power. The operations of 1620 may be performed according to the methods described herein. In some examples, aspects of the operations of 1620 may be performed by a Pathloss Measurement Component as described with reference to FIGS. 6 through 9.

At 1625, the UE may determine multiple pathloss values associated with CLI between the UE and the multiple UEs based on the resources, where each of the multiple pathloss values corresponds to a respective one of the multiple UEs. The operations of 1625 may be performed according to the methods described herein. In some examples, aspects of the operations of 1625 may be performed by a Multiple Pathloss Component as described with reference to FIGS. 6 through 9.

At 1630, the UE may determine the pathloss based on the multiple pathloss values. The operations of 1630 may be performed according to the methods described herein. In some examples, aspects of the operations of 1630 may be performed by a Pathloss Aggregation Component as described with reference to FIGS. 6 through 9.

At 1635, the UE may determine a transmit power for transmission of one or more uplink messages by the first UE based on the measured pathloss. The operations of 1635 may be performed according to the methods described herein. In some examples, aspects of the operations of 1635 may be performed by a Transmit Power Controller as described with reference to FIGS. 6 through 9.

At 1640, the UE may transmit the one or more uplink messages in accordance with the determined transmit power.

The operations of 1640 may be performed according to the methods described herein. In some examples, aspects of the operations of 1640 may be performed by an Uplink Transmitter as described with reference to FIGS. 6 through 9.

Figure 17:
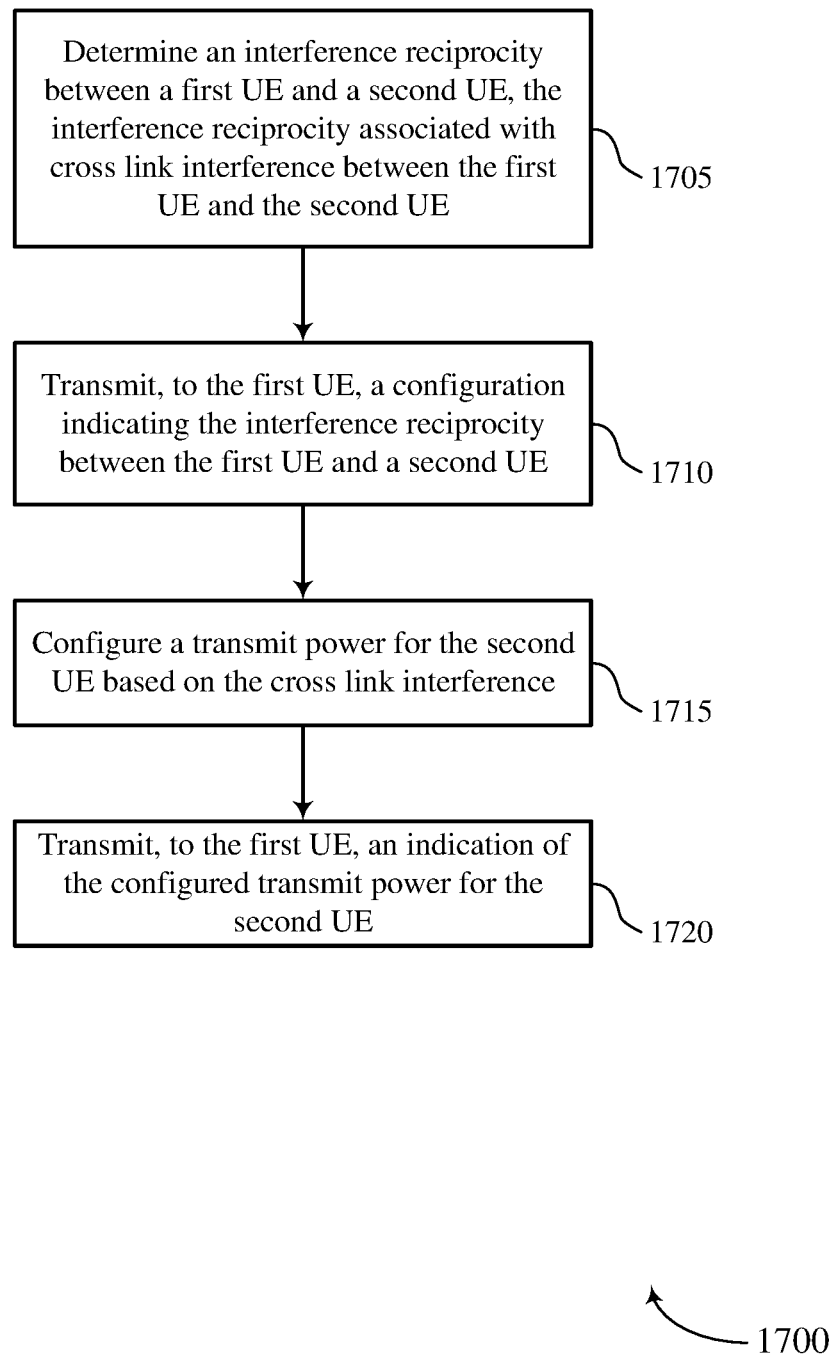

FIG. 17 shows a flowchart illustrating a method 1700 that supports power control based on reciprocity for CLI in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may determine an interference reciprocity between a first UE and a second UE, the interference reciprocity associated with CLI between the first UE and the second UE. The operations of 1705 may be performed according to the methods described herein. In some examples, aspects of the operations of 1705 may be performed by an Interference Reciprocity Component as described with reference to FIGS. 10 through 13.

At 1710, the base station may transmit, to the first UE, a configuration indicating the interference reciprocity between the first UE and a second UE. The operations of 1710 may be performed according to the methods described herein. In some examples, aspects of the operations of 1710 may be performed by a Configuration Transmission Component as described with reference to FIGS. 10 through 13.

At 1715, the base station may configure a transmit power for the second UE based on the CLI. The operations of 1715 may be performed according to the methods described herein. In some examples, aspects of the operations of 1715 may be performed by a Transmit Power Component as described with reference to FIGS. 10 through 13.

At 1720, the base station may transmit, to the first UE, an indication of the configured transmit power for the second UE. The operations of 1720 may be performed according to the methods described herein. In some examples, aspects of the operations of 1720 may be performed by a Transmit Power Indication Controller as described with reference to FIGS. 10 through 13.

Figure 18:
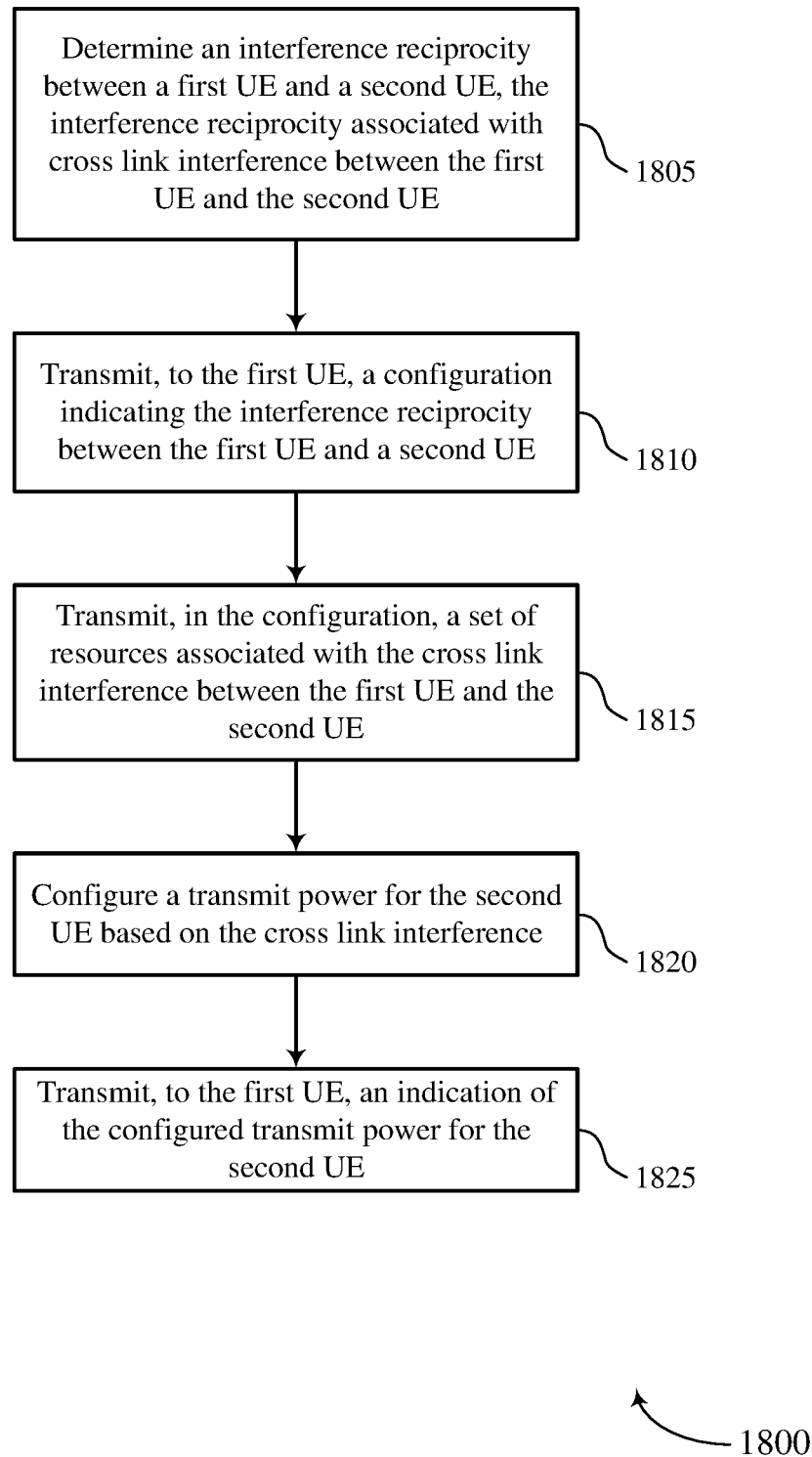

FIG. 18 shows a flowchart illustrating a method 1800 that supports power control based on reciprocity for CLI in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may determine an interference reciprocity between a first UE and a second UE, the interference reciprocity associated with CLI between the first UE and the second UE. The operations of 1805 may be performed according to the methods described herein. In some examples, aspects of the operations of 1805 may be performed by an Interference Reciprocity Component as described with reference to FIGS. 10 through 13.

At 1810, the base station may transmit, to the first UE, a configuration indicating the interference reciprocity between the first UE and a second UE. The operations of 1810 may be performed according to the methods described herein. In some examples, aspects of the operations of 1810 may be performed by a Configuration Transmission Component as described with reference to FIGS. 10 through 13.

At 1815, the base station may transmit, in the configuration, a set of resources associated with the CLI between the first UE and the second UE. The operations of 1815 may be performed according to the methods described herein. In some examples, aspects of the operations of 1815 may be performed by a CLI Resource Controller as described with reference to FIGS. 10 through 13.

At 1820, the base station may configure a transmit power for the second UE based on the CLI. The operations of 1820 may be performed according to the methods described herein. In some examples, aspects of the operations of 1820 may be performed by a Transmit Power Component as described with reference to FIGS. 10 through 13.

At 1825, the base station may transmit, to the first UE, an indication of the configured transmit power for the second UE. The operations of 1825 may be performed according to the methods described herein. In some examples, aspects of the operations of 1825 may be performed by a Transmit Power Indication Controller as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, from a network device, a configuration indicating an interference reciprocity between the first UE and a second UE, the interference reciprocity associated with cross link interference between the first UE and the second UE;
   receiving, from the network device, an indication of a configured transmit power of the second UE based at least in part on the cross link interference between the first UE and the second UE, the configured transmit power of the second UE being associated with an uplink transmission that corresponds to the cross link interference between the first UE and the second UE;
   measuring a pathloss associated with the cross link interference between the first UE and the second UE to determine a transmit power for transmission of one or more uplink messages by the first UE, the pathloss being measured based at least in part on the configured transmit power; and
   transmitting the one or more uplink messages in accordance with the determined transmit power.

2. The method of claim 1, further comprising:
   determining a resource associated with the cross link interference between the first UE and the second UE based at least in part on the configuration;
   performing an interference measurement on the resource; and
   determining the pathloss between the first UE and the second UE based at least in part on the interference measurement on the resource.

3. The method of claim 2, wherein determining the pathloss comprises:
   determining a difference between the configured transmit power of the second UE and the interference measurement performed on the resource.

4. The method of claim 2, wherein performing the interference measurement comprises:
   measuring a reference signal received power (RSRP) associated with the second UE on the resource.

5. The method of claim 2, wherein the interference measurement is performed using a same spatial filter used for the transmission of the one or more uplink messages.

6. The method of claim 1, further comprising:
   determining resources associated with the cross link interference between the first UE and multiple UEs;
   determining multiple pathloss values associated with the cross link interference between the first UE and the multiple UEs based at least in part on the resources, wherein each of the multiple pathloss values corresponds to a respective one of the multiple UEs; and
   determining the pathloss based at least in part on the multiple pathloss values.

7. The method of claim 6, wherein determining the pathloss comprises:
   determining the pathloss to be a minimum pathloss value of the multiple pathloss values.

8. The method of claim 6, wherein determining the pathloss comprises:
   determining the pathloss to be an average pathloss value of the multiple pathloss values in a decibel meter domain.

9. The method of claim 6, wherein determining the pathloss comprises:
   determining the pathloss to be an average pathloss value of the multiple pathloss values in a linear domain; and
   converting the average pathloss value of the multiple pathloss values in the linear domain to a decibel meter domain.

10. The method of claim 1, further comprising:
    identifying a pathloss coefficient based at least in part on the cross link interference; and
    determining the transmit power based at least in part on the measured pathloss and the pathloss coefficient.

11. The method of claim 1, wherein measuring the pathloss to determine the transmit power comprises:
    determining the transmit power based at least in part on a signal type associated with the one or more uplink messages, wherein the signal type comprises one of an uplink data channel, an uplink control channel, a reference signal, or a random access channel.

12. The method of claim 1, wherein measuring the pathloss to determine the transmit power comprises:
    adjusting the transmit power from a first value to a second value greater than the first value based at least in part on the measured pathloss exceeding a pathloss threshold.

13. The method of claim 1, wherein measuring the pathloss to determine the transmit power comprises:
    adjusting the transmit power from a first value to a second value less than the first value based at least in part on the measured pathloss being below a pathloss threshold.

14. The method of claim 1, wherein the configuration indicating the interference reciprocity between the first UE and the second UE comprises a first symbol and a second symbol associated with the cross link interference, the method further comprising:
    measuring the pathloss associated with the cross link interference between the first UE and the second UE in the first symbol; and
    transmitting at least one of the one or more uplink messages in the second symbol.

15. A method for wireless communications at a network device, comprising:
    transmitting, to a first user equipment (UE), a configuration indicating an interference reciprocity between the first UE and a second UE, the interference reciprocity being determined based at least in part on cross link interference between the first UE and the second UE;

configuring a transmit power for the second UE based at least in part on the cross link interference; and transmitting, to the first UE, an indication of the configured transmit power for the second UE, the configured transmit power of the second UE being associated with an uplink transmission that corresponds to the cross link interference between the first UE and the second UE.

16. The method of claim 15, further comprising:
transmitting, in the configuration, a set of resources associated with the cross link interference between the first UE and the second UE.

17. The method of claim 15, further comprising:
transmitting the configuration via radio resource control (RRC) signaling, medium access control (MAC) control element (MAC-CE), or downlink control information.

18. The method of claim 15, further comprising:
transmitting the indication of the configured transmit power for the second UE via radio resource control (RRC) signaling, medium access control (MAC) control element (MAC-CE), or downlink control information.

19. An apparatus for wireless communications at a first user equipment (UE), comprising:
a processor,
memory coupled with the processor; and
instructions stored in the memory and executable by the processor to cause the apparatus to:
receive, from a network device, a configuration indicating an interference reciprocity between the first UE and a second UE, the interference reciprocity associated with cross link interference between the first UE and the second UE;
receive, from the network device, an indication of a configured transmit power of the second UE based at least in part on the cross link interference between the first UE and the second UE, the configured transmit power of the second UE being associated with an uplink transmission that corresponds to the cross link interference between the first UE and the second UE;
measure a pathloss associated with the cross link interference between the first UE and the second UE to determine a transmit power for transmission of one or more uplink messages by the first UE, the pathloss being measured based at least in part on the configured transmit power; and
transmit the one or more uplink messages in accordance with the determined transmit power.

20. An apparatus for wireless communications at a network device, comprising:
a processor,
memory coupled with the processor; and
instructions stored in the memory and executable by the processor to cause the apparatus to:
transmit, to a first user equipment (UE), a configuration indicating an interference reciprocity between the first UE and a second UE, the interference reciprocity being determined based at least in part on cross link interference between the first UE and the second UE;
configure a transmit power for the second UE based at least in part on the cross link interference; and
transmit, to the first UE, an indication of the configured transmit power for the second UE, the configured transmit power of the second UE being associated with an uplink transmission that corresponds to the cross link interference between the first UE and the second UE.

21. An apparatus for wireless communications at a first user equipment (UE), comprising:
means for receiving, from a network device, a configuration indicating an interference reciprocity between the first UE and a second UE, the interference reciprocity associated with cross link interference between the first UE and the second UE;
means for receiving, from the network device, an indication of a configured transmit power of the second UE based at least in part on the cross link interference between the first UE and the second UE;
means for measuring a pathloss associated with the cross link interference between the first UE and the second UE to determine a transmit power for transmission of one or more uplink messages by the first UE, the pathloss being measured based at least in part on the configured transmit power; and
means for transmitting the one or more uplink messages in accordance with the determined transmit power.

22. An apparatus for wireless communications at a network device, comprising:
means for transmitting, to a first user equipment (UE), a configuration indicating an interference reciprocity between the first UE and a second UE, the interference reciprocity being determined based at least in part on cross link interference between the first UE and the second UE;
means for configuring a transmit power for the second UE based at least in part on the cross link interference; and
means for transmitting, to the first UE, an indication of the configured transmit power for the second UE, the configured transmit power of the second UE being associated with an uplink transmission that corresponds to the cross link interference between the first UE and the second UE.

23. A non-transitory computer-readable medium storing code for wireless communications at a first user equipment (UE), the code comprising instructions executable by a processor to:
receive, from a network device, a configuration indicating an interference reciprocity between the first UE and a second UE, the interference reciprocity associated with cross link interference between the first UE and the second UE;
receive, from the network device, an indication of a configured transmit power of the second UE based at least in part on the cross link interference between the first UE and the second UE;
measure a pathloss associated with the cross link interference between the first UE and the second UE to determine a transmit power for transmission of one or more uplink messages by the first UE, the pathloss being measured based at least in part on the configured transmit power; and
transmit the one or more uplink messages in accordance with the determined transmit power.

24. A non-transitory computer-readable medium storing code for wireless communications at a network device, the code comprising instructions executable by a processor to:
transmit, to a first user equipment (UE), a configuration indicating an interference reciprocity between the first UE and a second UE, the interference reciprocity being determined based at least in part on cross link interference between the first UE and the second UE;

configure a transmit power for the second UE based at least in part on the cross link interference; and transmit, to the first UE, an indication of the configured transmit power for the second UE, the configured transmit power of the second UE being associated with an uplink transmission that corresponds to the cross link interference between the first UE and the second UE.

* * * * *